(12) United States Patent
Narushima

(10) Patent No.: US 12,360,718 B1
(45) Date of Patent: Jul. 15, 2025

(54) MOBILE TERMINAL, INFORMATION PROCESSING DEVICE AND INFORMATION PROCESSING METHOD

(71) Applicant: MICWARE CO., LTD., Kobe (JP)

(72) Inventor: Kenji Narushima, Kobe (JP)

(73) Assignee: MICWARE CO., LTD.

( * ) Notice: Subject to any disclaimer, the term of this patent is extended or adjusted under 35 U.S.C. 154(b) by 0 days.

(21) Appl. No.: 19/096,721

(22) Filed: Apr. 1, 2025

Related U.S. Application Data

(63) Continuation of application No. PCT/JP2022/044054, filed on Dec. 1, 2022.

(51) Int. Cl.
  *G06F 3/14* (2006.01)
  *G06T 1/60* (2006.01)

(52) U.S. Cl.
  CPC . *G06F 3/14* (2013.01); *G06T 1/60* (2013.01)

(58) Field of Classification Search
  None
  See application file for complete search history.

(56) References Cited

U.S. PATENT DOCUMENTS

| | | | |
|---|---|---|---|
| 10,535,207 B1 | 1/2020 | Goluguri et al. | |
| 2024/0118702 A1* | 4/2024 | Cella | G05B 19/4155 |

FOREIGN PATENT DOCUMENTS

| | | |
|---|---|---|
| JP | 2018-17101 A | 2/2018 |
| JP | 2018-18461 A | 2/2018 |
| JP | 2020-184322 A | 11/2020 |

OTHER PUBLICATIONS

Japanese decision to grant a patent dated Mar. 17, 2025.
"Utilize the support of citizens using a game application, New service for manhole management is fascinating", [online], [searched on Nov. 18, 2022], Internet [URL : https://newswitch.jp/p/28392].

* cited by examiner

*Primary Examiner* — James M Hannett
(74) *Attorney, Agent, or Firm* — Yokoi & Co., U.S.A.; Toshiyuki Yokoi

(57) ABSTRACT

A mobile terminal including: a position obtainer configured to obtain a positional information; an image capturer configured to obtain a video including a still image during a movement, the video being associated with the positional information; a determination unit configured to determine whether or not the still image included in the video obtained by the image capturer satisfies a selection condition; and an image transmitter configured to transmit the still image which is determined to satisfy the selection condition by the determination unit while being associated with the positional information obtained by the position obtainer, wherein the determination unit is configured to obtain one or more attribute values associated with the still image, determine whether or not the one or more attribute values satisfies an inspection condition, and determine whether or not the still image determined to satisfy the inspection condition satisfies the selection condition.

3 Claims, 16 Drawing Sheets

Fig. 9

| ID | tag | reward condition | reward information | destination information |
|---|---|---|---|---|
| 1 | road crack | first position | 100 points | destination S1 |
| 2 | bridge damage | — | ¥200 | destination S2 |
| 3 | manhole damage | first manhole AND score >=0.8 | 100 points | — |
| | | first manhole AND score <0.8 | 50 points | |
| 4 | fallen object | tire | ¥100 | destination S4 |
| | | others | ¥50 | |

Fig. 10

| ID | tag | inspection condition |
|---|---|---|
| 1 | road crack | road type identifier ! = "highway" |
| 2 | bridge damage | location information = ".*bridge" |
| 3 | manhole damage | manhole location 1,<br>manhole location 2,<br>⋮<br>manhole location N |
| 4 | fallen object | road type identifier = "highway" |

Fig. 11

| ID | tag | | use information | selection condition |
|---|---|---|---|---|
| 1 | road crack | | learning model 1 | prediction result=1 AND score>=0.6 |
| 2 | bridge damage | | learning model 2 | prediction result=1 |
| 3 | manhole damage | | learning model 3 | prediction result=1 |
| 4 | fallen object | tire | image 1, image 2, image N | similarity>=0.8 |
| | | others | learning model 4 | prediction result=1 |

…

MOBILE TERMINAL, INFORMATION PROCESSING DEVICE AND INFORMATION PROCESSING METHOD

CROSS-REFERENCE TO RELATED APPLICATIONS

This application claims the benefit of priority and is a Continuation application of the prior International Patent Application No. PCT/JP2022/044354, with an international filing date of Dec. 1, 2022, which designated the United States, the entire disclosures of all applications are expressly incorporated by reference in their entirety herein.

TECHNICAL FIELD

The present invention relates to a mobile terminal and the like for performing a predetermined process on a video captured during a movement.

BACKGROUND OF THE INVENTION

Conventionally, there is a technology for letting participants record and collect photographs of manholes (maintenance holes) and information such as deterioration condition of the manholes using a map game application and giving points to the participants in accordance with the number of the photographs and the information (e.g., shown in Non-patent Document 1).

Patent Document 1 discloses an information processing device wherein a capturing device is provided on a moving body traveling on a road for capturing an area including a surface of the road, analyzing the captured image, determining defects of the road, identifying the image including the defects and outputting the identified image.

PRIOR ART

Patent Documents

[Patent Document 1] Japanese Patent Publication No. 2016-150719

Non-Patent Documents

[Non-patent Document 1] "Utilize the support of citizens using a game application, New service for manhole management is fascinating", [online], [searched on Nov. 18, 2022], Internet [URL: https://newswitch.jp/p/28392]

SUMMARY OF THE INVENTION

Problem to be Solved by the Invention

In the conventional technology, since the defects of the road or the like were determined for all still images contained in the captured video, efficient determination could not be achieved.

Meanwhile, when collecting similar defects determinations and only images containing the defects from drive recorders mounted on general vehicles, there are various problems. For example, there is the issue of rights processing for the collected images. Those providing images would like to receive some form of compensation for providing the images. Also, those using the images face the problem that they cannot freely use the images if other people's rights remain with the images.

Therefore, an object of the present invention is to provide a video utilization system where both the image provider and the image user can provide and use images without hindrance.

Means for Solving the Problems

A mobile terminal of the first aspect of the present invention includes: a position obtainer configured to obtain a positional information; an image capturer configured to obtain a video including a still image during a movement, the video being associated with the positional information; a determination unit configured to determine whether or not the still image included in the video obtained by the image capturer satisfies a selection condition; and an image transmitter configured to transmit the still image which is determined to satisfy the selection condition by the determination unit while being associated with the positional information obtained by the position obtainer.

The above described configuration allows to select and use the still image satisfying the condition from the videos captured by the mobile terminal.

A mobile terminal of the second aspect of the present invention is the mobile terminal according to the first aspect, wherein the determination unit is configured to obtain one or more attribute values associated with the still image, determine whether or not the one or more attribute values satisfies an inspection condition, and determine whether or not the still image determined to satisfy the inspection condition satisfies the selection condition.

The above described configuration allows to determine whether or not the still image satisfying the inspection condition satisfies the selection condition. Thus, the required still image can be obtained efficiently.

A mobile terminal of the third aspect of the present invention is the mobile terminal according to the first aspect or the second aspect, wherein the determination unit is configured to determine whether or not the still image satisfies each of a plurality of selection conditions, the determination unit further includes a tag obtainer which is configured to obtain a tag corresponding to the selection condition determined to be satisfied by the determination unit, and the image transmitter is configured to transmit the still image while being associated with the tag and the positional information.

The above described configuration allows to select and use the still image satisfying each of a plurality of conditions from the videos captured by the mobile terminal.

A mobile terminal of the fourth aspect of the present invention is the mobile terminal according to any one of the first to third aspects, wherein the determination unit is configured to obtain an analysis result of the still image included in the video, the determination unit further includes a tag obtainer which is configured to obtain a tag using the analysis result of the still image determined to satisfy the selection condition by the determination unit, and the image transmitter is configured to transmit the still image while being associated with the tag and the positional information.

The above described configuration allows to add an appropriate tag to the still image satisfying the condition.

A mobile terminal of the fifth aspect of the present invention is the mobile terminal according to any one of the first to fourth aspects, wherein a camera constituting the image capturer is installed on a position capturing a movement surface of the mobile terminal or a neighborhood of the movement surface, and the image capturer is configured to capture the movement surface or the neighborhood of the movement surface during the movement to obtain the video.

The above described configuration allows to select and use the still image satisfying the condition from the videos capturing the movement surface of the mobile terminal or the neighborhood of the movement surface.

A mobile terminal of the sixth aspect of the present invention is the mobile terminal according to any one of the first to fifth aspects, wherein the selection condition is one of the following conditions: there is a crack in a road within the still image; there is a damage to a bridge within the still image; there is a damage to a manhole on the road within the still image; or there is a fallen object on the road within the still image.

The above described configuration allows to select and use the still image for checking the crack on the road, the damage of the bridge or the damage of the manhole which is the defect of the movement surface of the mobile terminal or the neighborhood of the movement surface.

An information processing device of the seventh aspect of the present invention is the information processing device including: a receiver configured to receive the still image associated with the positional information from the mobile terminal according to any one of the first to sixth aspects; and an accumulator configured to accumulate the still image received by the receiver while being paired with the positional information.

The above described configuration allows to receive and accumulate the selected still image satisfying the condition from the videos captured by the mobile terminal.

An information processing device of the eighth aspect of the present invention is the information processing device including: a receiver configured to receive a video including a plurality of still images associated with a positional information and captured when the mobile terminal is moved; a determination unit configured to determine whether or not the plurality of still images included in the video received by the receiver satisfies a selection condition; and an accumulator configured to accumulate the plurality of still images determined to satisfy the selection condition by the determination unit while being associated with the positional information associated with the plurality of still images.

The above described configuration allows to select and accumulate the still image satisfying the condition from the videos captured by the mobile terminal.

An information processing device of the ninth aspect of the present invention is the information processing device according to the seventh aspect or the eighth aspect, wherein a tag is associated with the plurality of still images, a destination information identifying a destination of the plurality of still images is associated with the tag, a transmitter is further provided to transmit the still images to the destination identified by the destination information associated with the tag associated with the plurality of still images.

The above described configuration allows to automatically transmit the still image to the destination requiring the still images.

An information processing device of the tenth aspect of the present invention is the information processing device according to any one of the seventh to ninth aspects, wherein the plurality of still images or the video received by the receiver is associated with a right holder identifier identifying a right holder of the plurality of still images or the video, and a right holder processor is further provided to perform a right holder process which is a process related to the right holder identified by the right holder identifier.

The above described configuration allows to perform an appropriate process related to the right holder of the still image.

An information processing device of the eleventh aspect of the present invention is the information processing device according to the tenth aspect, wherein the right holder identifier is associated with the video which is the source of the still images, and the right holder processor includes a rewarding unit configured to performing a rewarding process which is a process of providing a reward to the right holder identified by the right holder identifier.

The above described configuration allows to provide the reward to the right holder of the video captured by the mobile terminal.

An information processing device of the twelfth aspect of the present invention is the information processing device according to the tenth aspect, wherein the right holder processor includes a first preserver configured to perform a first preservation process which is a process of accumulating the still image while being associated with an attribute value set associated with the still image.

The above described configuration allows to preserve the still image satisfying the selection condition.

An information processing device of the thirteenth aspect of the present invention is the information processing device according to the ninth aspect, wherein the right holder processor includes a second preserver configured to perform a second preservation process which is a process of accumulating the still image while being associated with the right holder identifier associated with the still image.

The above described configuration allows to set an appropriate right holder as the right holder of the still image.

An information processing device of the fourteenth aspect of the present invention is the information processing device according to the ninth aspect, wherein a transmitter is further provided to transmit to the still images to a user terminal, and the right holder processor includes a third preserver configured to accumulate the still images while being associated with the right holder identifier corresponding to the user terminal.

The above described configuration allows to set a right holder requiring the still image as the right holder of the still image satisfying the selection condition.

An information processing device of the fifteenth aspect of the present invention is the information processing device according to any one of the twelfth to fourteenth aspect, wherein the right holder processor includes a fourth preserver configured to perform a fourth preservation process which is a process of storing a preservation information including an access information for accessing the still image in a blockchain.

The above described configuration allows to preserve the preservation information of the still image requiring the preservation.

Effects of the Invention

The present invention allows to select and accumulate the still image satisfying the condition from the videos captured by the mobile terminal.

BRIEF DESCRIPTION OF DRAWINGS

FIG. 9 is a drawing showing a reward management table in the first embodiment.

FIG. 10 is a drawing showing an inspection condition management table in the first embodiment.

FIG. 11 is a drawing showing a selection condition management table in the first embodiment.

DETAILED DESCRIPTION OF THE INVENTION

Figure 1:
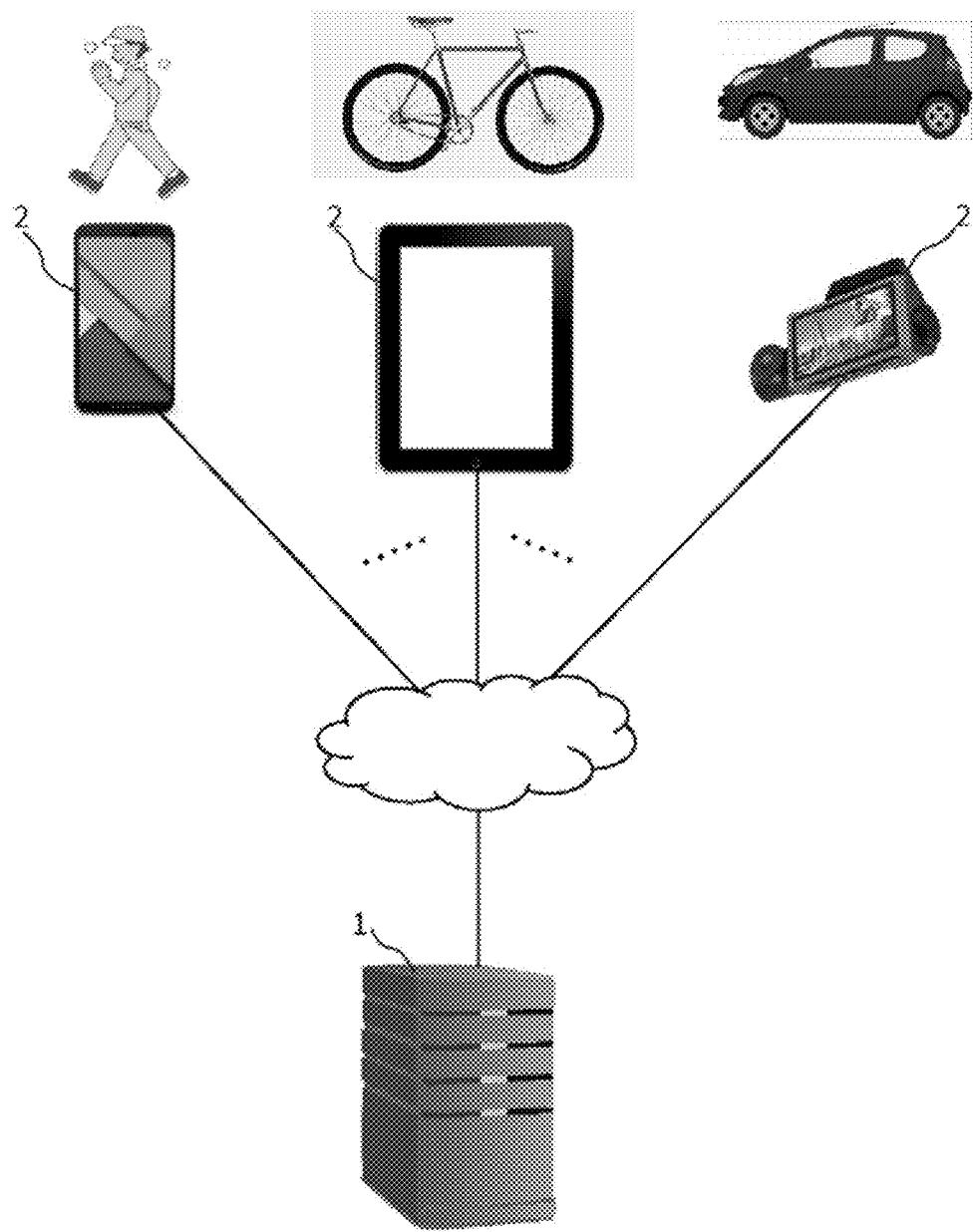
FIG. 1 is a schematic diagram of an information system A in the first embodiment.

Hereafter, embodiments of a mobile terminal and other configurations will be explained with reference to the drawings. The repeated explanation of the components denoted with the same reference numerals may be omitted in the embodiments since the operations are the same.

First Embodiment

Outline of First Embodiment

The present embodiment explains a mobile terminal configured to transmit a still image satisfying a selection condition, a positional information and the like when the still image constituting a video captured by the mobile terminal satisfies the selection condition. For example, the mobile terminal determines whether or not the still image satisfying a detection condition satisfies the selection condition. The selection condition is, for example, that there is a crack in a road, there is a damage to a bridge, there is a damage to a manhole or there is a fallen object on the road. The still image may also be called a field or a frame.

The present embodiment also explains a mobile terminal configured to determine whether or not a plurality of selection conditions is satisfied and transmit the still image having a tag corresponding to the selection condition when the selection condition is satisfied.

The present embodiment also explains a mobile terminal configured to obtain a tag corresponding to the still image and transmit the still image having the tag.

The present embodiment further explains an information processing device configured to perform a right holder process which is a process related to a right holder of the still image. The right holder process is, for example, the later-described rewarding process and later-described various preservation processes.

In the specification, the fact that information X is associated with the information Y means that the information Y can be obtained from the information X or that the information X can be obtained from the information Y. The information X may be associated with the information Y in any manner. The information X and the information Y may be linked with each other or may be in the same buffer. The information X may be included in the information Y. The information Y may be included in the information X.

<Outline of Information System A>

FIG. 1 is a schematic diagram of an information system A in the present embodiment. The information system A includes an information processing device 1 and one or a plurality of mobile terminals 2.

The information processing device 1 is a server configured to accumulate the still images and the like transmitted by each of one or a plurality of mobile terminals 2. The information processing device 1 is a cloud server or an application service provider (ASP) server, for example. The type of the information processing device 1 is not limited. The information processing device 1 may be a device included in a blockchain. Since the information processing device 1 mainly performs the processes related to the images, the information processing device 1 can be referred to as an image processing device.

The mobile terminal 2 is installed in a movable body to capture videos. The mobile terminal 2 is, for example, a drive recorder, a smartphone, a tablet terminal, a camera with a communication function or a glasses-type camera. The installation normally means the condition where something is fastened. However, it is also possible to consider that the installation includes the situation where something is contacted or held. The mobile terminal 2 may be, for example, a terminal held by a person. The mobile terminal 2 may include a drive means such as an engine or a transportation means such as wheels. The mobile terminal 2 is a terminal that is not fixed to a structure, ground or the like. The movable device is an object that moves. The movable device is, for example, a ground movable device, a marine movable device, an undersea movable device, an aeronautical movable device, a space movable device or a living thing. The ground movable device is, for example, a vehicle or a robot. The marine movable device is, for example, a ship. The undersea movable device is, for example, a submarine. The aeronautical movable device is, for example, an airplane or a drone. The space movable device is, for example, a rocket or an artificial satellite.

The information processing device 1 and each of the one or more mobile terminals 2 can generally communicate with each other through a network such as the Internet.

Figure 2:
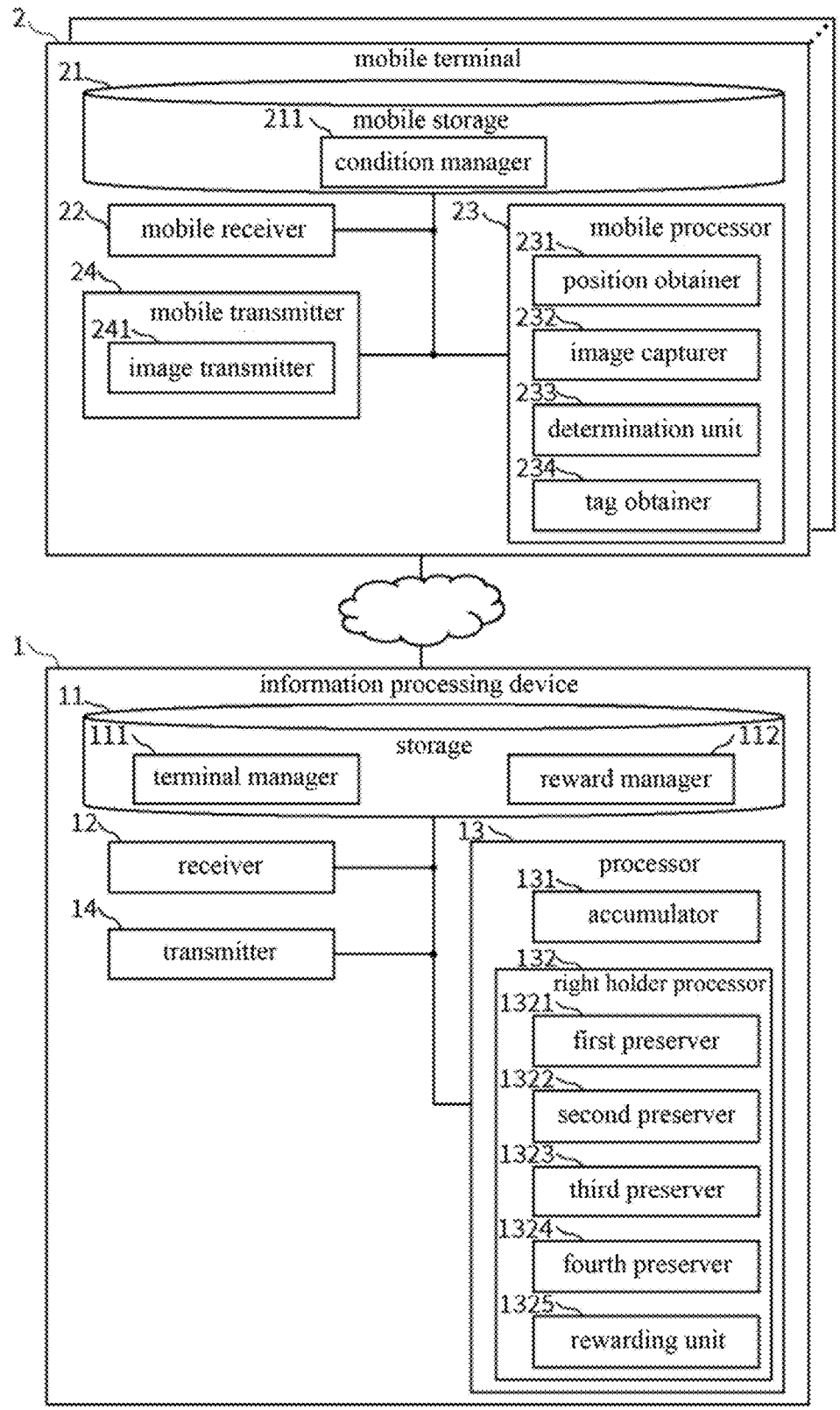
FIG. 2 is a block diagram of the information system A in the first embodiment.

FIG. 2 is a block diagram of the information system A in the present embodiment. The information processing device 1 constituting the information system A includes a storage (storage unit) 11, a receiver (reception unit) 12, a processor (processing unit) 13 and a transmitter (transmission unit) 14. The storage 11 includes a terminal manager (terminal management unit) 111 and a reward manager (reward management unit) 112. The processor 13 includes an accumulator (accumulation unit) 131 and a right holder processor (right holder processing unit) 132. The right holder processor 132 includes a first preserver (first preservation unit) 1321, a second preserver (second preservation unit) 1322, a third preserver (third preservation unit) 1323, a fourth preserver (fourth preservation unit) 1324 and a rewarding unit 1325.

The mobile terminal 2 includes a mobile storage (mobile storage unit) 21, a mobile receiver (mobile reception unit) 22, a mobile processor (mobile processing unit) 23 and a mobile transmitter (mobile transmission unit) 24. The mobile storage 21 includes a condition manager (condition management unit) 211. The mobile processor 23 includes a position obtainer (position obtaining unit) 231, an image capturer (image capturing unit) 232, a determination unit 233 and a tag obtainer (tag obtaining unit) 234. The mobile transmitter 24 includes an image transmitter (image transmission unit) 241.

<Detail of Components of Information Processing Device 1>

The storage 11 stores various kinds of information. The various kinds of information is, for example, the later-described mobile terminal information, the still image and the positional information, one or more destination information, and one or more pairs of the tag and the destination information.

The destination information is the information that identifies the destination to which the still image is transmitted. The destination information is, for example, an email address, a phone number, a user identifier of a communication application or an IP address of a destination terminal.

The tag is the information for identifying the properties of the still image. The tag is, for example, the information resulting from the analysis of the still image. The tag is, for example, the information indicating a classification of the still image. The tag is, for example, the information indicating a characteristic element contained in the still image. The tag is, for example, "manhole damage," "road crack," "bridge damage" or "fallen object." The tag is also called a metadata.

The terminal manager 111 stores one or a plurality of terminal information. The terminal information is the information related to the mobile terminal 2. The terminal information includes, for example, a terminal identifier and an attribute value set. The terminal information may be associated with the video captured by the mobile terminal 2. The terminal identifier may be included in the attribute value set.

The terminal identifier is the information for identifying the mobile terminal 2. The terminal identifier may be a right holder identifier for identifying the right holder which is a user of the mobile terminal 2. The fixed terminal identifier is, for example, an identification (ID) of the mobile terminal 2, a user identifier of the user of the mobile terminal 2, a name of the mobile terminal 2, an IP address of the mobile terminal 2 or a media access control (MAC) address of the mobile terminal 2.

The right holder is a person having any right about the video captured by the mobile terminal 2 or the still image transmitted by the mobile terminal 2. The right holder is, for example, an owner of the still image, a copyright holder of the still image, an owner of the mobile terminal 2 capturing the still image or an authority with disposal rights of the still image. The right holder is, for example, an initial right holder of the still image. Although the right holder is normally the owner of the mobile terminal 2, the right holder may be any person who has the right of the video captured by the mobile terminal 2 or any person who has the right of the still image transmitted by the mobile terminal 2.

The right holder identifier is an identifier of the right holder of the selected still image. The right holder identifier may be the terminal identifier. The right holder identifier is, for example, an identification (ID) of the right holder, a name of the right holder, a mail address of the right holder or a telephone number of the right holder. The ID of the right holder is, for example, a user identifier.

The attribute value set is a set of one or a plurality of attribute values. The attribute value is an attribute value of the still image. The attribute value may be an attribute value of the video including the still image. The attribute value is, for example, an environment information, a tag or a score.

The environment information is the information about the environment where the video is captured. The environment information is, for example, a positional information, a road type identifier, a location information, a direction information, a camera information, a time information, a weather information, a temperature information or a season information. The positional information is the information for identifying a capturing position. The capturing position is a location of the camera capturing the video. The positional information is, for example, a set of a latitude and a longitude or a set of a latitude, a longitude and an altitude. The positional information may be an area identifier identifying an area on a map, a road identifier identifying an address or a road, or a traffic-lane identifier identifying a traffic lane on a road. The positional information is normally associated with the still image. The road type identifier is the information for identifying a type of the road travelled by the moving body. The road type identifier is, for example, "highway," "national road" or "prefectural road." The location information is the information identifying the location. The location information is, for example, a place name, a bridge name, or a road name. The direction information is the information for identifying the capturing direction. The direction information is, for example, the angle from the true north. The camera information is the information related to the camera. The camera information is, for example, an angle of view and a resolution. The time information is the information for identifying the time when the video is captured. The time when the video is captured may be the time around the time when the video is captured. The accuracy may not be required for the time when the video is captured. The time information is, for example, a time, a set of year, month, day and hour, a set of year, month, day, hour and minute, a set of year, month, day, hour, minute and second, a set of year, month and day or a set of month and day. Namely, the time information may indicate the time with any granularity. The weather information is the information for identifying the weather at the time when and at the location where the video is captured. The weather information is, for example, "sunny," "rainy," "snowy" or "cloudy." The temperature information is the information for identifying an outside temperature at the time when and at the location where the video is captured. The temperature information is, for example, "25 degrees" or "30 degrees or higher." The season information is the information for identifying the season when and at the location where the video is captured. The season information is, for example, "spring," "summer," "early summer" or "winter."

The score is, for example, the information indicating the certainty of a determination or the degree of a situation. The score is, for example, the score when the manhole is determined to be damaged, the score when the road is determined to be cracked, the score when the bridge is determined to be damaged, the score when the fallen object exists on the road, the degree of the damage of the manhole, the degree or the size of the crack of the road, or the degree of the damage of the bridge.

The reward manager 112 manages one or a plurality of reward information. The reward information is preferably associated with the tag. Namely, it is preferable that the reward corresponding to providing the still image of the road damage and the reward corresponding to providing the still image of the manhole damage are different, for example. The reward information is preferably associated with the score. Namely, it is preferable that higher score corresponds to higher reward. The reward information is the information for determining the reward. The reward information is, for example, an amount of money, a point or a calculation formula for determining the reward amount.

The receiver 12 receives various information and instructions from the mobile terminal 2 or a not-illustrated terminal. The various information and instructions are, for example, the still image, the positional information, the attribute value set, the output instruction, the purchase instruction, the later described inspection condition or the later described selection condition. Note that the not-illustrated terminal is, for example, a user terminal or an operator terminal. The user terminal is the terminal to which the still image was transmitted, the terminal of the user requesting the still image or the terminal of the user utilizing the still image. The operator terminal is the terminal of the operator of the information processing device 1.

The receiver 12 receives the still image associated with the positional information from the mobile terminal 2. The receiver 12 receives one or a plurality of still images from the mobile terminal 2. Note that the above described still image is the still image satisfying the selection condition. The receiver 12 may normally receive the video including the still image satisfying the selection condition. Even when receiving the video, since the still image included in the video is received, it can be considered that the still image is received. The still image received by the receiver 12 may include the still image that does not satisfy the selection condition.

The receiver 12 receives, for example, the output instruction or the purchase instruction from the user terminal.

The output instruction is the instruction for outputting the still image and the like. The output instruction is the instruction for instructing the user terminal to output the still image and the like. The output instruction is, for example, associated with the positional information. The still image and the like are, for example, the still image and the attribute value set.

The purchase instruction is the instruction for purchasing the still image. The purchase instruction is associated with the user identifier. The purchase instruction normally includes the information identifying the still image. The purchase instruction includes, for example, a still image identifier. The purchase instruction includes, for example, a purchase condition. The purchase condition is, for example, a purchase price. The purchase condition includes, for example, the information identifying a right period.

The receiver 12 receives, for example, the inspection condition from the user terminal or the operator terminal (not illustrated) of the operator of the information processing device 1. The receiver 12 receives, for example, the selection condition from the user terminal or the operator terminal.

The processor 13 performs various processes. For example, the various processes are performed by the accumulator 131 and the right holder processor 132.

The accumulator 131 accumulates the still image received by the receiver 12 while being paired with the received positional information.

The right holder processor 132 performs the right holder process. The right holder process is the process about the right holder identified by the right holder identifier. The right holder identifier is, for example, the right holder identifier associated with the source video of the still image satisfying the selection condition. The right holder identifier is, for example, the right holder identifier received while being paired with the still image. The right holder identifier is, for example, the information for identifying the person utilizing the still image satisfying the selection condition. The person utilizing the still image is, for example, the user who downloaded the still image from the user terminal or the user identified by the user identifier for the user terminal to which the still image was sent. Note that the user may be an organization that utilizes the still image. The organization is, for example, a company, a local government or a national institution.

The right holder process is the process about the right of one still image. The right holder process is, for example, the later-described first preservation process, the later-described second preservation process, the later-described third preservation process, the later-described fourth preservation process and the later-described rewarding process.

The first preserver 1321 performs the first preservation process of accumulating the still image satisfying the selection condition while being associated with the attribute value set associated with the still image. Note that the still image satisfying the selection condition is the still image received by the receiver 12 or the still image selected by the later-described information processing device 3. The attribute value set associated with the still image may be the attribute value set associated with the source video of the still image.

The second preserver 1322 performs the second preservation process of accumulating the still image satisfying the selection condition while being associated with the right holder identifier corresponding to the still image. The right holder identifier associated with the still image may be the right holder identifier corresponding to the source of the still image.

The third preserver 1323 accumulates the still image satisfying the selection condition while being associated with the right holder identifier corresponding to the user terminal.

The fourth preserver 1324 performs the fourth preservation process of accumulating a preservation information including an access information for accessing the still image.

Note that the fourth preserver 1324 preferably accumulates the preservation information in a blockchain. Namely, the fourth preserver 1324 preferably accumulates the preservation information in a distributed ledger in a blockchain. The fourth preserver 1324 preferably registers the preservation information as an NFT (non-fungible token). The fourth preserver 1324 preferably registers the preservation information in a distributed file system in an IPFS (Inter Planetary File System) network.

The preservation information is the information for retaining the originality of the still image. The preservation information may be referred to as the headline information of the still image. The preservation information is, for example, the access information and the attribute value set. The preservation information preferably includes, for example, one or a plurality of right holder identifiers. When the preservation information includes a plurality of right holder identifiers, the video may be shared by right holders or the plurality of right holder identifiers may be right holder history information. The right holder history information is a set of right holder identifiers and information indicating the history of right holder changes. The fourth preservation process guarantees the originality of the preservation information of the registered still image. The guarantee of the originality of the preservation information also guarantees the originality of the video corresponding to the preservation information. Note that the access information is the information for accessing the video. The access information is the information for identifying the destination in which the video is accumulated. The access information is, for example, URL and URI.

The rewarding unit 1325 performs the rewarding process of providing the reward to the right holder identified by the right holder identifier. The rewarding unit 1325 normally performs the rewarding process to the right holder who has the right of the mobile terminal 2 transmitting the still image.

For example, the rewarding unit 1325 performs the rewarding process of obtaining the reward information corresponding to the tag paired with the still image satisfying the selection condition from the reward manager 112 and providing the reward corresponding to the reward information.

For example, the rewarding unit 1325 performs the rewarding process of obtaining the reward information corresponding to the score paired with the still image satisfying the selection condition from the reward manager 112 and providing the reward corresponding to the reward information.

For example, the rewarding unit 1325 performs the rewarding process of obtaining the reward information corresponding to the tag and the score paired with the still image satisfying the selection condition from the reward manager 112 and providing the reward corresponding to the reward information.

The rewarding process is the process of providing the reward. For example, the rewarding process is the process of increasing points managed in a manner paired with each of one or a plurality of right holder identifiers associated with the still image. For example, the rewarding process is the process of paying money to the right holder identified by each of one or a plurality of right holder identifiers associated with the still image. For example, the rewarding process is the process of transmitting the still image or other contents to the user terminal of the right holder identified by each of one or a plurality of right holder identifiers associated with the still image. The rewarding process may be any processes of providing a merit to the right holder identified by each of one or a plurality of right holder identifiers associated with the still image. The content of the rewarding process is not limited. The reward may be provided in any form, including money, points, products, and contents. The content of the reward is not limited.

The rewarding unit 1325 preferably performs the rewarding process of obtaining the video attribute values set corresponding to the still image transmitted by the transmitter 14, determining the reward to each of a plurality of right holders using the attribute values set and providing the reward.

The rewarding unit 1325 preferably performs the rewarding process of obtaining a reward amount corresponding to a service identifier for identifying the service performed on the still image and providing the reward corresponding to the reward amount. Note that the service identifier is, for example, "output" and "purchasing." In the above described case, the storage 11 stores the reward amount corresponding to the service identifier.

For example, the rewarding unit 1325 performs the rewarding process of obtaining the reward amount using one or a plurality of information of the attribute value set and the service identifier and providing the reward corresponding to the reward amount. In the above described case, an arithmetic expression or a reward correspondence table corresponding to each of a plurality of service identifiers is stored in the storage 11, for example. The arithmetic expression is the expression for calculating the reward amount using one or a plurality of video attribute values included in the attribute value set as parameters. The reward correspondence table includes a plurality of reward correspondence information for managing the reward amount corresponding to one or a plurality of video attribute values.

The rewarding unit 1325 normally performs the process of causing the user that has enjoyed the service relevant to the still image to pay the reward.

The process of causing the user to pay the reward is, for example, the process of causing the user to pay the obtained reward amount and the profit obtained by the management side of the information processing device 1. The process of causing the user to pay the reward is, for example, the process of reducing the points corresponding to the user receiving the service or the settlement process using the credit card number of the corresponding user.

The transmitter 14 transmits the still image to the user terminal. For example, the transmitter 14 transmits the still image corresponding to the output instruction to the user terminal when the output instruction is received from the user terminal.

The transmitter 14 transmits the still image to the destination identified by the destination information associated with the tag associated with the still image. In the above described case, the transmitter 14 automatically transmits the still image. When the still image is received, the transmitter 14 preferably obtains the tag associated with the still image, obtains the destination information corresponding to the tag from the storage 11, and transmits the still image to the destination identified by the destination information. The transmitter 14 preferably transmits the still image immediately when the still image is received, <Detail of Components of Mobile Terminal 2>

The mobile storage 21 included in the mobile terminal 2 stores various kinds of information. The various information is, for example, the video, the still image satisfying the selection condition, the attribute value set, the right holder identifier, one or a plurality of inspection condition, one or a plurality of pair of the selection condition and the tag, or the map information.

For example, one or more attribute values included in the attribute value set are associated with one or more still images included in the video. The one or more mobile attribute values may be associated with all still images, associated with one still image or associated with a plurality of still images.

The condition manager 211 stores one or a plurality of selection conditions. The condition manager 211 may store one or a plurality of inspection conditions. The selection condition is preferably associated with the tag. The tag is, for example, "crack of road," "damage of bridge," "damage of manhole," "fallen object," and "identifier of fallen object." The "identifier of fallen object" is, for example, "tire," "wood" or "unknown."

The inspection condition is the condition for determining the still image to be judged for satisfying the selection condition. By using the inspection condition, the number of the processes of determining the selection condition can be reduced. Thus, the overall processing cost can be reduced. The inspection condition is the condition based on one or more attribute values corresponding to the still image. One or more attribute values here are, for example, the environment information and the attribute value of the road on which the mobile body is traveling. The environment information here is, for example, the positional information, the time information, the weather information, the temperature information and the season information. The attribute value of the road is, for example, the road type identifier (e.g., highway) and the location information. The positional information is, for example, the information identifying the location where the manhole exists and the information for identifying the location where the bridge exists.

The selection condition is the condition for selecting the still image in the video. The selection condition is the condition related to the content of the still image. The selection condition is, for example, the condition that there is a crack on the road within the still image, there is a damage to the bridge within the still image, there is a damage to the manhole on the road within the still image, or there is a fallen object on the road within the still image.

For example, the selection condition includes the learning model for determining whether or not the selection condition is satisfied. For example, the selection condition includes the image for determining whether or not the selection condition is satisfied. For example, the selection condition preferably includes the image for determining whether or not the selection condition is satisfied and a threshold value for the similarity. Note that the threshold value for the similarity is the threshold value for the similarity between the still image and the image included in the selection condition. The selection condition is, for example, that the similarity is within the threshold value or greater than the threshold value.

The learning model is the information configured through the learning process of the machine learning and is the information used in the prediction process of the machine learning. For example, the learning model is the information obtained by performing the learning module of the machine learning using one or more positive example training data and one or more negative example training data. The learning model may be also referred to as a learning device, a classifier, a classification model or the like. The algorithm of the machine learning is not limited. The deep learning, the random forest, the decision tree, SVM and the like can be used. Various existing functions and libraries of the machine learning such as a library of TensorFlow, a module of random forest of R language and TinySVM can be used for the machine learning, for example.

The positive example training data includes the still image satisfying the selection condition. The negative example training data includes the still image not satisfying the selection condition. The still image satisfying the selection condition is, for example, the still image including the road with the crack, the still image including the bridge with the damage, the still image including the manhole with the damage and the still image including the road with the fallen object.

The image for determining whether or not the selection condition is satisfied is, for example, the still image including the road with the crack, the still image including the bridge with the damage, the still image including the manhole with the damage and the still image including the road with the fallen object.

The mobile receiver 22 receives various information. The various information is, for example, one or a plurality of inspection conditions, and one or a plurality of pairs of the selection condition and the tag.

The mobile processor 23 performs various processes. For example, the various processes are performed by the position obtainer 231, the image capturer 232, the determination unit 233 and the tag obtainer 234. For example, the mobile processor 23 accumulates the information received by the mobile receiver 22 in the mobile storage 21. For example, the mobile processor 23 transforms the data structure of the information received by the mobile receiver 22 for output.

For example, the mobile processor 23 may perform all functions that a navigation terminal can perform.

For example, the mobile processor 23 obtains the attribute value set during video capturing. The mobile processor 23 accumulates the obtained attribute value set in the mobile storage 21. For example, the mobile processor 23 associates the obtained attribute value set with the video. The operation of associating the attribute value set with the video is normally the operation of associating the attribute value set with the still image in the video. The attribute value set and the still image are preferably synchronized temporally.

The attribute value set is, for example, one or more environment information. The environment information is, for example, the positional information, the time information, the weather information, the temperature information or the season information.

The mobile processor 23 obtains, for example, the time information from a not-illustrated clock during video capturing. The mobile processor 23 obtains, for example, the time information continuously, at predetermined intervals, or when the selection condition is satisfied.

The mobile processor 23 obtains, for example, the time information from a not-illustrated clock during video capturing, and obtains the season information corresponding to the time information.

The mobile processor 23 obtains, for example, the weather information during video capturing. The mobile processor 23 obtains, for example, the weather information corresponding to the positional information from a not-illustrated server. The mobile processor 23 obtains, for example, the weather information continuously, at predetermined intervals, or when the obtaining condition is satisfied.

The mobile processor 23 obtains, for example, the temperature information during video capturing. The mobile processor 23 obtains, for example, the temperature information corresponding to the positional information from a not-illustrated server. The mobile processor 23 obtains, for example, the temperature information from a temperature sensor installed in the movable body. The mobile processor 23 obtains, for example, the temperature information continuously, at predetermined intervals, or when the selection condition is satisfied.

The mobile processor 23 preferably includes, for example, a microphone to obtain sound information and accumulate the sound information while being associated with the video obtained by the image capturer 232. Note that the above described function is, for example, the function of a drive recorder.

The position obtainer 231 obtains the positional information. The position obtainer 231 normally obtains the positional information during video capturing. The position obtainer 231 obtains, for example, the positional information by the held GPS receiver. The position obtainer 231 obtains, for example, the positional information continuously or at predetermined intervals.

The image capturer 232 obtains the video including the still image and corresponding to the positional information during video capturing. The image capturer 232 preferably captures a movement surface or a neighborhood of the movement surface to obtain the video. Note that the neighborhood is the range captured by the camera. The neighborhood is, for example, the range within a threshold distance from the position indicated by the positional information.

The determination unit 233 determines whether or not the still image included in the video captured by the image capturer 232 satisfies the selection condition.

For example, the determination unit 233 preferably determines whether or not a part of the still image in the video satisfies the selection condition. For example, the determination unit 233 determines whether or not the selection condition is satisfied with respect to only one still image in N still images (N is a natural number of 2 or more).

The determination unit 233 preferably obtains one or more attribute values corresponding to the still image included in the video obtained by the image capturer 232, determines whether or not the one or more attribute values satisfy the inspection condition and determines whether or not the still image determined to satisfy the inspection condition satisfies the selection condition. Here, the determination unit 233 preferably determines, for example, whether or not the inspection condition is satisfied by extracting the still image included in the video obtained by the image capturer 232.

The attribute value here is, for example, the positional information, the identifier of a specific object in the still image, the road type identifier travelled by the moving body and the location information identifying the location traveled by the moving body. The positional information is, for example, the information indicating the location where the manhole exists. In the above described case, the inspection condition is, for example, the condition that the distance between the positional information indicating the location where the manhole exists and the positional information corresponding to the still image obtained by the position obtainer 231 is within a threshold value or less than the threshold value.

For example, the determination unit 233 determines whether or not the still image included in the video obtained by the image capturer 232 satisfies the inspection condition. Then, the determination unit 233 may determine, for example, whether or not the selection condition is satisfied for each of a plurality of continuing still images including the still image determined to satisfy the inspection condition. In the above described case, when a plurality of still images satisfying the selection condition is detected, the determination unit 233 may select one specific still image in the plurality of still images or the plurality of continuing still images. Note that the one specific still image is, for example, the still image at a specific order (e.g., middle) in the plurality of continuing still images or the still image in which the target object (e.g., damage, fallen object) appears the largest.

Note that each of the plurality of continuing still images including the still image determined to satisfy the inspection condition may be the still image after the still image which is determined to satisfy the inspection condition or the still image before the still image which is determined to satisfy the inspection condition.

For example, the determination unit 233 gives the still image included in the video obtained by the image capturer 232 and the learning model included in the selection condition to a prediction module of the machine learning, executes the prediction module, and obtains a determination result indicating whether or not satisfying the selection condition. It is preferred that determination unit 233 also obtains the score here. It is preferable that the score is the information outputted by the prediction module. The score may be referred to as, for example, the certainty of the determination result. Note that the determination result is, for example, "1" indicating that the selection condition is satisfied or "0" indicating that the selection condition is not satisfied. Here, the still image included in the video obtained by the image capturer 232 is preferably the still image satisfying the inspection condition.

It is preferred that the determination unit 233 also obtains the analysis result of the still image included in the video. The analysis result is, for example, the identifier of the object on the road in the still image. The identifier of the object is, for example, the identifier of the fallen object. The identifier of the fallen object is, for example, the name of the fallen object or the ID of the fallen object.

The determination unit 233 preferably determines whether or not a specific object is included in the still image included in the video and determines whether or not the still image determined to include the specific object satisfies the selection condition. Note that the specific object is, for example, the manhole or the fallen object. The fallen object is not limited. The fallen object is, for example, a tire, a wood or a pet bottle. The fact that the specific object is included may be considered as the fact that the inspection condition is satisfied.

When a plurality of selection conditions is stored in the condition manager 211, the determination unit 233 determines whether or not the still image satisfies each of the plurality of selection conditions.

The tag obtainer 234 obtains the tag corresponding to the selection condition which is determined to be satisfied by the determination unit 233. The tag obtainer 234 obtains the tag from the condition manager 211. Note that it can be considered that tag is also the attribute value.

For example, the tag obtainer 234 obtains the tag using the analysis result of the still image determined to satisfy the selection condition by the determination unit 233. The tag obtainer 234 obtains, for example, the object identifier which is the analysis result.

The mobile transmitter 24 transmits various information to the information processing device 1. The various information is, for example, the still image, the video and the attribute value set. Namely, the mobile transmitter 24 may transmit the video including the still image determined to satisfy the selection condition by the determination unit 233 to the information processing device 1.

The image transmitter 241 transmits the still image determined to satisfy the selection condition by the determination unit 233 while being associated with the positional information obtained by the position obtainer 231. The image transmitter 241 preferably transmits the still image determined to satisfy the selection condition by the determination unit 233 while being associated with the positional information and the right holder identifier.

The image transmitter 241 may also transmit the attribute values other than the positional information while being associated with the still image. The attribute values other than the positional information are not limited. The attribute values other than the positional information are, for example, the tag, the location information, the road type identifier and the time information.

The image transmitter 241 may transmit the video including the still image determined to satisfy the selection condition by the determination unit 233 to the information processing device 1. The above described video is the continuing still images satisfying the selection condition. The above described video preferably includes one or more still images before the still image satisfying the selection condition or/and one or more still images after the still image satisfying the selection condition. Note that the image transmitter 241 normally transmits the still image and the like to the information processing device 1.

<Operation>

Then, the operation example of the information system A will be explained. First, the operation example of the information processing device 1 will be explained using the flowchart in FIG. 3. Note that "S" shown in each flowchart used in the following explanation means the step.

(S301) The receiver 12 determines whether or not the inspection condition and the like are received from a not-illustrated terminal. When the inspection condition and the like are received, the processing proceeds to S302. When the inspection condition and the like are not received, the processing proceeds to S303. Note that the inspection condition and the like are, for example, the inspection condition and the tag.

(S302) The transmitter 14 transmits the inspection condition and the like received in S301 to one or a plurality of mobile terminals 2 managed in the terminal manager 111. The processing returns to S301. Note that the processor 13 may accumulate the inspection condition and the like in the storage 11.

(S303) The receiver 12 determines whether or not the selection condition and the like are received from a not-illustrated terminal. When the selection condition and the like are received, the processing proceeds to S304. When the selection condition and the like are not received, the processing proceeds to S305. Note that the selection condition and the like are, for example, the selection condition and the tag. The selection condition may include usage information used for the selection. The usage information is, for example, a learning model and an image.

(S304) The transmitter 14 transmits the selection condition and the like received in S303 to one or more mobile terminals 2 managed by the terminal manager 111. The processing returns to S301. Note that the processor 13 may accumulate the selection condition and the like in the storage 11.

(S305) The receiver 12 determines whether or not the still image and the like are received from the mobile terminal 2. When the still image and the like are received, the processing proceeds to S306. When the still image and the like are not received, the processing proceeds to S309. Note that the still image and the like are, for example, the still image and the tag and the attribute value set and the right holder identifier.

(S306) The processor 13 determines whether or not the still image and the like received in S305 satisfies the notification condition. When the notification condition is satisfied, the processing proceeds to S307. When the notification condition is not satisfied, the processing proceeds to S301.

(S307) The processor 13 obtains the destination information corresponding to the still image and the like received in S305. The transmitter 14 transmits the still image and the like received in S305 to the destination indicated in the destination information.

(S308) The right holder processor 132 performs a preservation process. The processing returns to S301. Note that the example of the preservation process will be explained using the flowchart in FIG. 4.

(S309) The receiver 12 determines whether or not the output instruction is received from the user terminal. When the output instruction is received, the processing proceeds to S311. When the output instruction is not received, the processing proceeds to S312.

(S310) The processor 13 obtains the access information of the still image and the like corresponding to the output instruction. Then, the processor 13 obtains the still image and the like from the access destination indicated by the access information.

(S311) The transmitter 14 transmits the still image and the like obtained in S310 to the user terminal from which the output instruction is transmitted.

(S312) The receiver 12 determines whether or not the purchase instruction is received from the user terminal. When the purchase instruction is received, the processing proceeds to S313. When the purchase instruction is not received, the processing returns to S301. Note that the purchase instruction is associated with the user identifier of the user who is a purchaser.

(S313) The processor 13 obtains the access information of the still image and the like corresponding to the purchase instruction. Then, the processor 13 obtains the still image and the like from the access destination indicated by the access information.

(S314) The processor 13 obtains the user identifier corresponding to the purchase instruction. The above described user identifier is the identifier of the user purchasing the still image.

(S315) The fourth preserver 1324 performs the fourth preservation process. The processing returns to S301. Note that the example of the fourth preservation process will be explained using the flowchart in FIG. 5.

Figure 3:
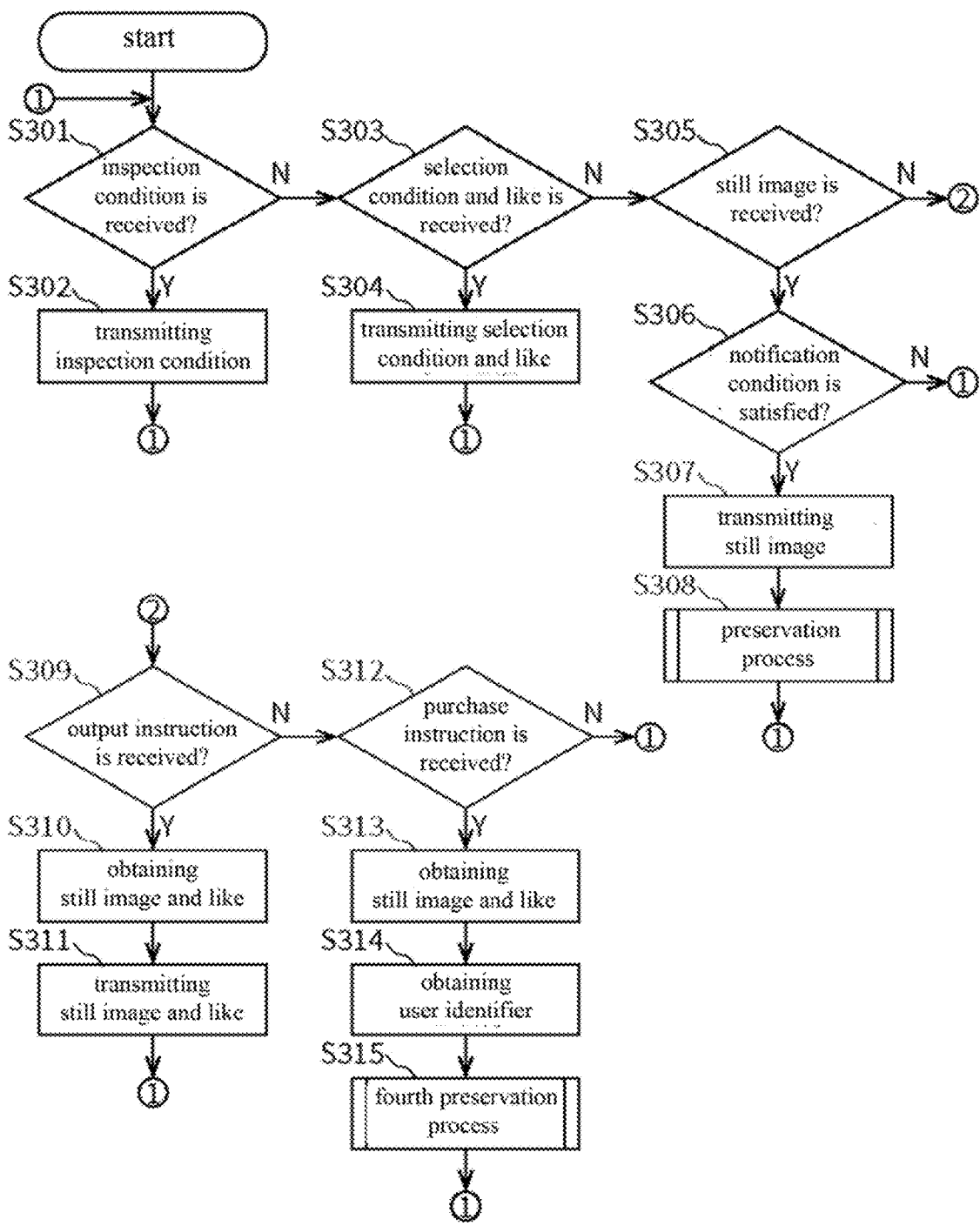
FIG. 3 is a flowchart for explaining an operation example of the information processing device 1 in the first embodiment.

In the flowchart in FIG. 3, the process ends when the power is turned off or the instruction of ending process is interrupted.

Figure 4:
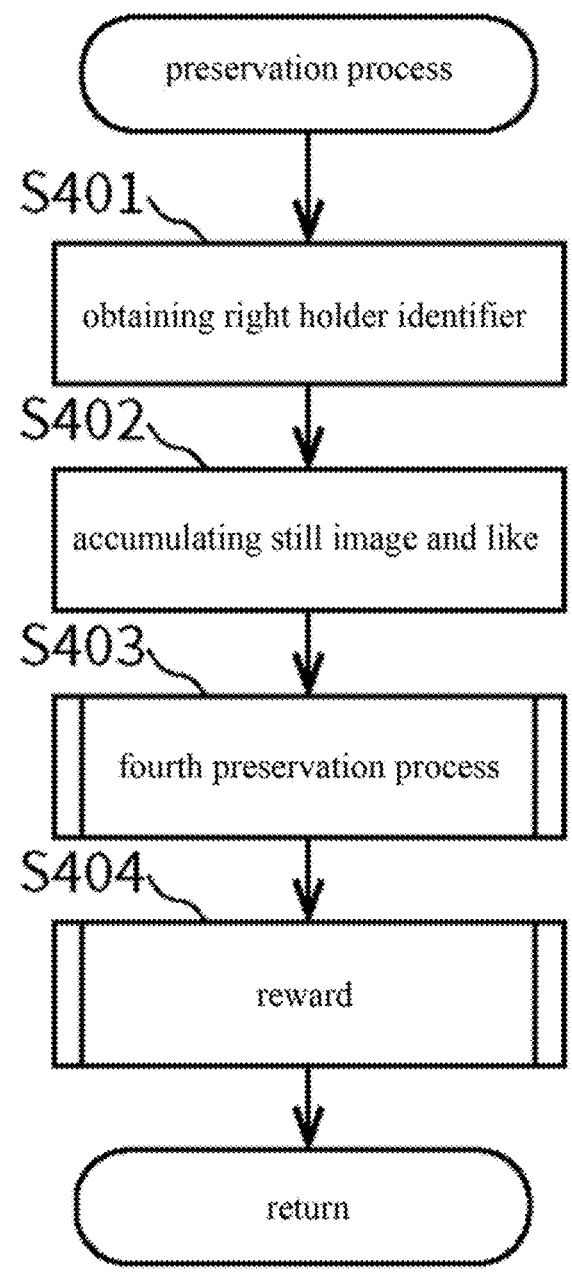
FIG. 4 is a flowchart for explaining an example of a preservation process in the first embodiment.

Then, the example of the fourth preservation process in S308 will be explained using the flowchart in FIG. 4.

(S401) The first preserver 1321 obtains the right holder identifier. The above described right holder identifier is normally the right holder identifier paired with the received still image. However, the right holder identifier is the right holder identifier paired with the tag which is paired with the received still image and may be the right holder identifier stored in the storage 11. The above described right holder identifier is the identifier of the user requiring the still image.

(S402) The first preserver 1321 accumulates the received still image and the like while being associated with the right holder identifier obtained in S401.

(S403) The fourth preserver 1324 performs the fourth preservation process. Note that the example of the fourth preservation process will be explained using the flowchart in FIG. 5.

(S404) The rewarding unit 1325 performs the rewarding process. The processing returns to S301. The example of the rewarding process will be explained using the flowchart in FIG. 6.

Figure 5:
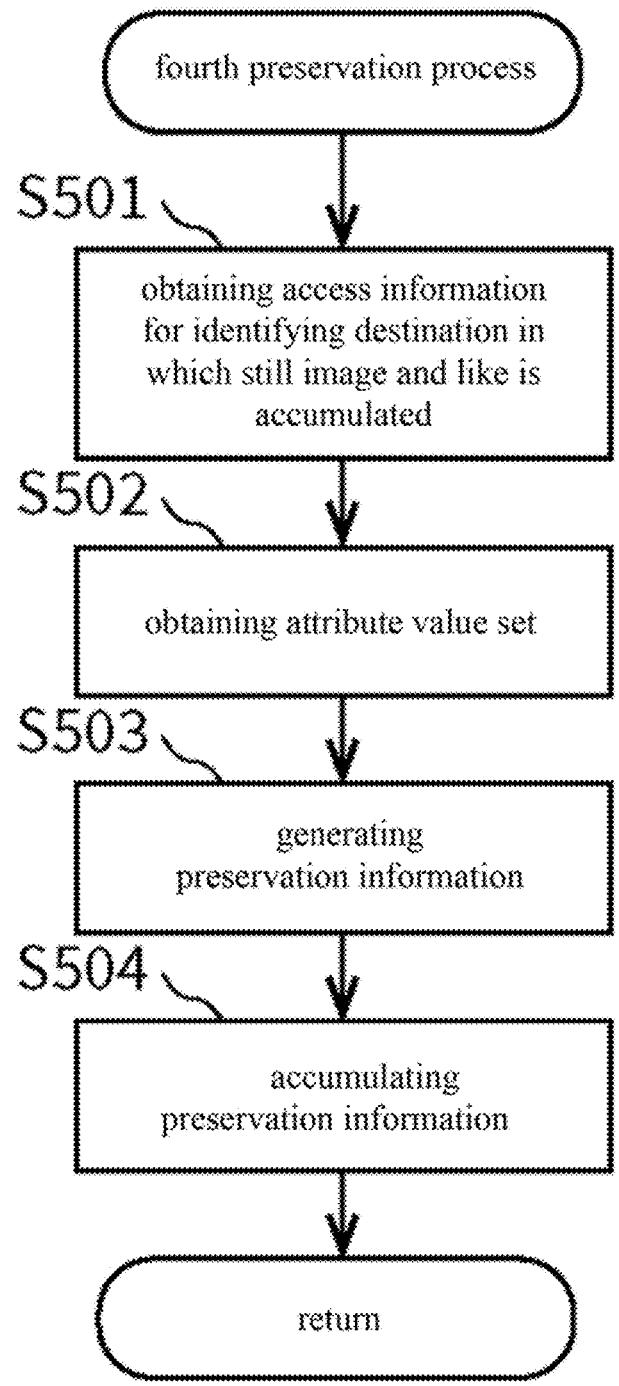
FIG. 5 is a flowchart for explaining an example of a fourth preservation process in the first embodiment.

The example of the fourth preservation process in S315 and S403 will be explained using the flowchart in FIG. 5.

(S501) The fourth preserver 1324 obtains the access information identifying the destination of the still image and the like.

(S502) The fourth preserver 1324 obtains the attribute value set corresponding to the accumulated still image and the like.

(S503) The fourth preserver 1324 generates the preservation information including the access information obtained in S501, the attribute value set obtained in S502 and the right holder identifier of the still image and the like. When new right holder identifier is obtained, the fourth preserver 1324 generates, for example, the preservation information including the new right holder identifier and the original right holder identifier. Note that the new right holder identifier is normally the identifier of the user requiring the still image. (S504) The fourth preserver 1324 accumulates the preservation information generated in S503. The processing returns to the upstream process. The fourth preserver 1324 accumulates the preservation information in a blockchain, for example.

Then, the example of the rewarding process in S404 will be explained using the flowchart in FIG. 6.

(S601) The rewarding unit 1325 obtains one or a plurality of right holder identifiers of the target still image and the like. The rewarding unit 1325 may obtain the right holder identifier of the past right holder of the target still image and the like.

(S602) The rewarding unit 1325 obtains the attribute value set of the target still image and the like.

(S603) The rewarding unit 1325 obtains the service identifier for identifying the service performed on the target still image and the like. The service identifier is, for example, "output" and "purchasing."

(S604) The rewarding unit 1325 obtains the reward amount using one or a plurality of information in the attribute value set obtained in S602 and the service identifier obtained in S603.

When a plurality of right holder identifiers is obtained, the rewarding unit 1325 obtains the reward amount to each of the right holder identifiers. When the history information of the right holder including a plurality of right holder identifiers is obtained, the rewarding unit 1325 may obtain the reward amount to each of the right holder identifiers.

(S605) The rewarding unit 1325 performs the process of providing the reward to the right holder identified by the right holder identifier obtained in S601 by the reward amount obtained in S604.

(S606) The rewarding unit 1325 performs the process of causing the user that has enjoyed the service relevant to the target still image and the like to pay the reward. The processing returns to the upstream process. Note that the target still image and the like are normally the video transmitted to the user terminal.

Figure 6:
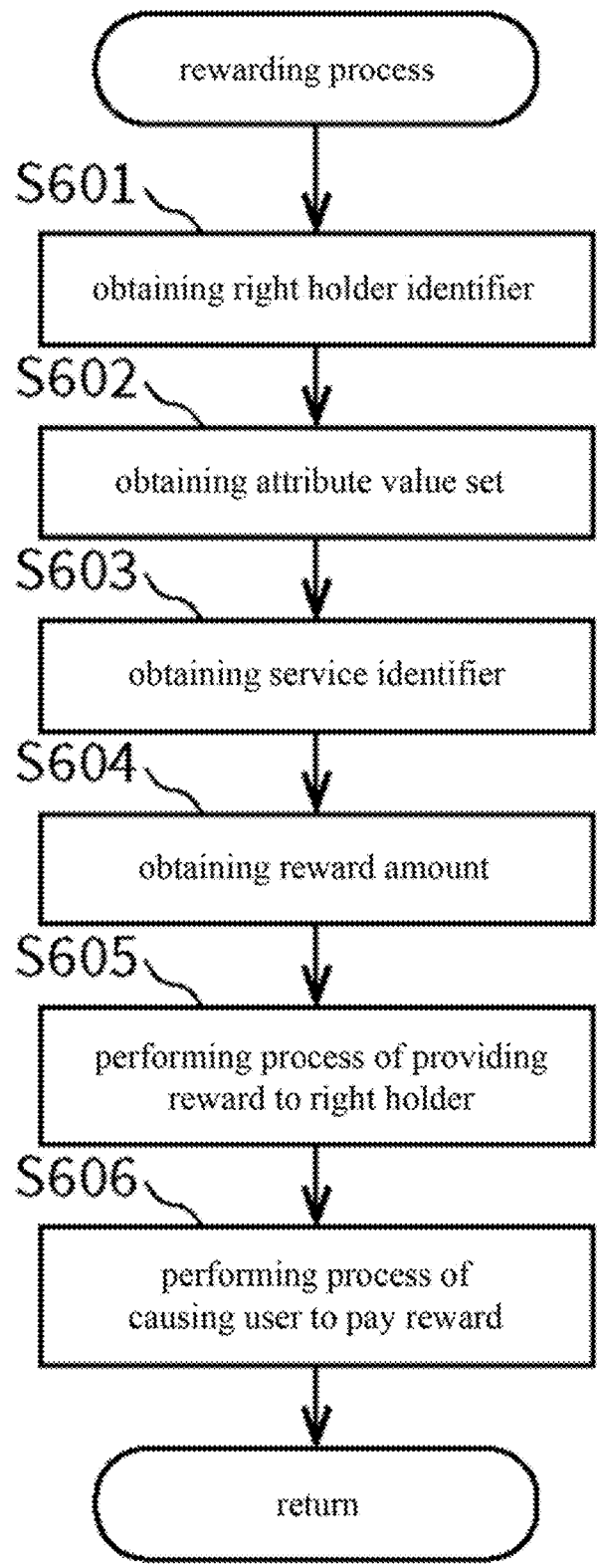
FIG. 6 is a flowchart for explaining an example of a rewarding process in the first embodiment.

In the flowchart in FIG. 6, it is possible to obtain the profit obtained by the management side of the information processing device 1 and accumulates the profit.

In the flowchart in FIG. 6, the rewarding unit 1325 may obtain the reward information associated with the tag paired with the target still image from the reward manager 112 and obtain the reward amount using the reward information.

Then, the operation example of the mobile terminal 2 will be explained using the flowchart in FIG. 7.

(S701) The mobile receiver 22 determines whether or not the inspection condition and the like are received from the information processing device 1. When the inspection condition and the like are received, the processing proceeds to S702. When the inspection condition and the like are not received, the processing proceeds to S703. Note that the inspection condition and the like are, for example, the inspection condition and the tag.

(S702) The mobile processor 23 accumulates the inspection condition and the like received in S701 in the condition manager 211. The processing returns to S701.

(S703) The mobile receiver 22 determines whether or not the selection condition and the like are received from the information processing device 1. When the selection condition and the like are received, the processing proceeds to S704. When the selection condition and the like are not received, the processing proceeds to S705. Note that the selection condition and the like are, for example, the selection condition and the tag. The selection condition and the like are, for example, the selection condition, the usage information and the tag.

(S704) The mobile processor 23 accumulates the selection condition and the like received in S703 in the condition manager 211. The processing returns to S701.

(S705) The mobile processor 23 determines whether or not the start of movement is detected. When the start of movement is detected, the processing proceeds to S706. When the start of movement is not detected, the processing returns to S701. Note that the start of movement is detected when the engine of the movable body provided with the mobile terminal 2 is turned on or when the mobile terminal 2 is turned on, for example.

(S706) The image capturer 232 starts to capture the video.

(S707) The image capturer 232 obtains the video and accumulates the video in the mobile storage 21.

(S708) The mobile processor 23 obtains the attribute value set of the mobile terminal 2. Namely, the position obtainer 231 obtains the current positional information. The mobile processor 23 obtains the other attribute values. The other attribute values are, for example, the time information, the weather information, the temperature information and the season information.

(S709) The mobile processor 23 substitutes 1 for a counter i.

(S710) The mobile processor 23 determines whether or not the i-th still image exists in the video obtained in S707. When the i-th still image exists 6, the processing proceeds to S711. When the i-th still image does not exist, the processing proceeds to S716.

(S711) The determination unit 233 performs the determination process on the i-th still image. The example of the determination process will be explained using the flowchart in FIG. 8.

(S712) When the determination result in S711 is the information of "satisfying the selection condition," the processing proceeds to S713. When the determination result in S711 is the information of "not satisfying the selection condition," the processing proceeds to S715.

(S713) The tag obtainer 234 obtains the tag paired with each of one or a plurality of satisfying selection conditions from the mobile storage 21.

(S714) The mobile processor 23 generates the information including the still image and one or more tags. Note that the mobile processor 23 here may generate the information including a plurality of still images including the still image satisfying the selection condition. It is preferable that all of a plurality of still images satisfy the selection condition. However, it is possible to include the still image not satisfying the selection condition. It is preferable that a plurality of still images is the continued still images in time series manner.

(S715) The mobile processor 23 increments the counter i by 1. The processing returns to S710.

Note that the mobile processor 23 here preferably increments the counter i by N (N is a natural number of 2 or more). Namely, it is preferable to perform the determination process in FIG. 8 on the still images which are thinned-out.

(S716) The mobile processor 23 determines whether or not the information is generated in S714. When the information is generated, the processing proceeds to S717. When the information is not generated, the processing proceeds to S720.

(S717) The mobile processor 23 obtains the right holder identifier from the mobile storage 21.

(S718) The mobile processor 23 generates the information to be transmitted using the right holder identifier and the information generated in S714.

(S719) The image transmitter 241 transmits the information generated in S718 to the information processing device 1.

(S720) The mobile processor 23 determines whether or not the end of movement is detected. When the end of movement is detected, the processing returns to S701. When the end of movement is not detected, the processing returns to S709. Note that the mobile processor 23 detects the end of movement when the engine is turned off, when the power of the mobile terminal 2 is turned off or the arrival to the destination, for example.

Then, the example of the determination process in S711 will be explained using the flowchart in FIG. 8.

(S801) The determination unit 233 substitutes 1 for a counter i.

(S802) The determination unit 233 determines whether or not the i-th tag exists. When the i-th tag exists, the processing proceeds to S803. When the i-th tag does not exist, the processing returns to the upstream process.

(S803) The determination unit 233 determines whether or not the inspection condition corresponding to the i-th tag exists. When the inspection condition exists, the processing proceeds to S804. When the inspection condition does not exist, the processing proceeds to S807.

(S804) The determination unit 233 obtains the inspection condition corresponding to the i-th tag.

(S805) The determination unit 233 obtains one or more attribute values used for the judgement of the inspection condition obtained in S804 from the attribute value set.

(S806) The determination unit 233 determines whether or not one or more attribute values obtained in S805 satisfy the inspection condition obtained in S804. When the inspection condition is satisfied, the processing proceeds to S807. When the inspection condition is not satisfied, the processing proceeds to S810.

(S807) The determination unit 233 obtains the selection condition and the like corresponding to the i-th tag. Note that the selection condition and the like are, for example, the selection condition and the usage information.

(S808) The determination unit 233 determines whether or not the target still image satisfies the selection condition obtained in S807. When the selection condition is satisfied, the processing proceeds to S809. When the selection condition is not satisfied, the processing proceeds to S810.

Note that the target still image here may be only the still image satisfying the inspection condition. However, the target still image may be a plurality of surrounding still images including the still image satisfying the inspection condition. The plurality of surrounding still images is normally a plurality of continuing still images within a predetermined time period. However, the plurality of surrounding still images may be the still images arbitrarily extracted within the predetermined time period. The predetermined time period is, for example, 10 seconds or 5 seconds.

(S809) The determination unit 233 substitutes the value "satisfy" to the variable "i-th determination result" corresponding to the i-th tag. Note that the initial value of "i-th determination result" is "not satisfy."

(S810) The determination unit 233 increments the counter i by 1. The processing returns to S802.

Specific Operation Example

Hereafter, the specific operation example of the information system A in the present embodiment will be explained.

It is assumed that the terminal manager 111 of the information processing device 1 currently stores the terminal information including a terminal identifier and a destination information for each of one or a plurality of mobile terminals 2. It is assumed that the information processing device 1 transmits the inspection condition, the selection condition and the like to the mobile terminal 2 and the mobile terminal 2 receives the inspection condition, the selection condition and the like.

In the reward manager 112, a reward management table having a structure shown in FIG. 9 is stored. The reward management table is the table for managing one or a plurality of reward management information. The reward management table includes "ID," "tag," "reward condition," "reward information" and "destination information." The "ID" is the information for identifying the record. The "reward condition" is the condition under which the reward is generated. The "reward information" is the amount of money or the point. The "destination information" is the information indicating the destination of the user to which the still image and the like corresponding to the tag are transmitted. The "destination information" is, for example, a mail address, a telephone number, a facsimile number, an ID of notification application or an IP address of the user terminal used by the user. The destination is, for example, a person in charge of an organization of a local government that formulates countermeasures for the road crack, the bridge damage, or the manhole damage or a person in charge of a road corporation that removes the fallen object from the highway.

Here, the reward information is managed for each tag. Namely, the reward to the selected still image varies depending on the selection condition. A plurality of different reward information may be obtained according to the reward condition corresponding to one tag (shown in the record "ID=3" in FIG. 9). The reward condition "first position" is the condition that the positional information associated with the selected still image is the first positional information in one or more positional information associated with the already received still images. Note that the positional information other than the first positional information may be only the positional information matched with any of one or more already received positional information. Alternatively, it is also possible to include the positional information where the difference between both positional information is within a threshold value or less than the threshold value. The score included in the reward condition is the score obtained by the prediction module of machine learning.

An inspection condition management table shown in FIG. 10 is stored in the condition manager 211 of the mobile terminal 2. One or more records including "ID," "tag" and "inspection condition" are stored in the inspection condition management table. The "ID" is the information for identifying the record. The "inspection condition" is preferably managed for each tag. The inspection condition of "ID=1" is the condition for inspecting the crack of the road. The inspection condition of "road type identifier!="highway"" indicates that the condition is applied to the roads other than the highway. "!=" means "not equal." The inspection condition of "ID=2" is the condition for inspecting the damage of the bridge. The inspection condition "location information=" ".*bridge"" indicates that the name of the location being traveled ends with "bridge" (traveling on a bridge). The inspection condition of "ID=3" is the condition for inspecting the damage of the manhole. The above described inspection condition is a set of the positional information indicating the position of each manhole. The inspection condition of "ID=4" is the condition for inspecting the fallen object on the road. The inspection condition "road type identifier="highway"" indicates that the condition is applied only to the highway.

A selection condition management table shown in FIG. 11 is stored in the condition manager 211. One or more records including "ID," "tag," "usage information" and "selection condition" are stored in the selection condition management table. The "usage information" is the information used when determining whether or not the selection condition is satisfied. The "usage information" is, for example, the learning model or the image. The image is the source image for obtaining a similarity with the still image included in the captured video. The "selection condition" is, for example, the condition based on a prediction result, the condition based on the prediction result and the score or the condition based on the similarity between two images. The prediction result is an execution result (objective variable) of the prediction module of the machine learning. The score is the value obtained as a result of executing the prediction module.

In FIG. 11, the learning model 1 is the information obtained by providing a plurality of positive example images capturing a portion of the road with the crack and a plurality of negative example images capturing a portion of the road without the crack to the prediction module of the machine learning and executing the learning module. The learning model 2 is the information obtained by providing a plurality of positive example images capturing a portion of the bridge with the damage and a plurality of negative example images capturing a portion of the bridge without the damage to the prediction module of the machine learning and executing the learning module. The learning model 3 is the information obtained by providing a plurality of positive example images capturing a portion of the manhole with the damage and a plurality of negative example images capturing a portion of the manhole without the damage to the prediction module of the machine learning and executing the learning module. The learning model 4 is the information obtained by providing a plurality of positive example images capturing a portion of the road with the fallen object on the highway and a plurality of negative example images capturing a portion of the road without the fallen object on the highway to the prediction module of the machine learning and executing the learning module. Note that each of the positive example images is preferably the image capturing various fallen objects in the past on the highway. Each of the image 1, the image 2, —and the image N is the image capturing various tires fallen on the highway. The selection condition "similarity >=0.8" means that the similarity to any one of the image 1 to the image N is 0.8 or more.

SPECIFIC EXAMPLES

In the above described situation, the specific example is explained below. The specific example is the case where the car is traveling on the national road, the highway or the like and the mobile terminal 2 mounted on the car detects the road crack, the bridge damage, the manhole damage or the fallen object and the mobile terminal 2 transmits the still image at the time of detection, the still image, the right holder identifier and the attribute value set to the information processing device 1.

While the car is traveling, the image capturer 232 of the mobile terminal 2 captures the video. While the car is traveling, the position obtainer 231 constantly obtains the positional information. While the car is traveling, the mobile processor 23 obtains the attribute value set. Here, the attribute value set includes the road type identifier and the location information. Note that the attribute value set may also include, for example, other attribute values such as time information. Note that the technology for obtaining the road type identifier and the location information of the road being traveled using the navigation function of the car is known technology.

Figure 8:
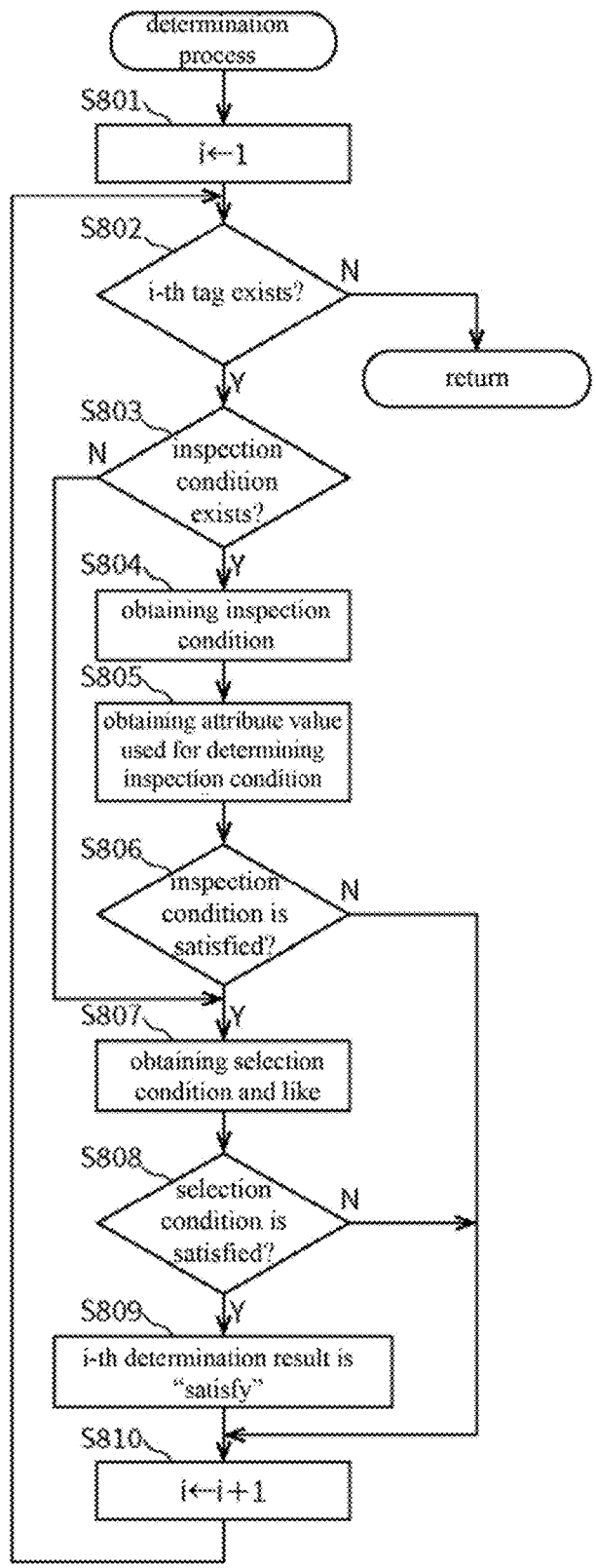
FIG. 8 is a flowchart for explaining an example of a determination process in the first embodiment.

In accordance with the flowchart in FIG. 8, the determination unit 233 refers to the inspection condition management table (FIG. 10) and determines whether or not each of the still images included in the captured video satisfies the inspection condition of any record. When the inspection condition of any record is satisfied, in accordance with the flowchart in FIG. 8, the determination unit 233 refers to the selection condition management table (FIG. 11) and obtains the usage information and the selection condition paired with the tag corresponding to the satisfied inspection condition. Then, the determination unit 233 determines whether or not the selection condition is satisfied using the still image satisfying the inspection condition and the obtained usage information and selection condition.

Figure 7:
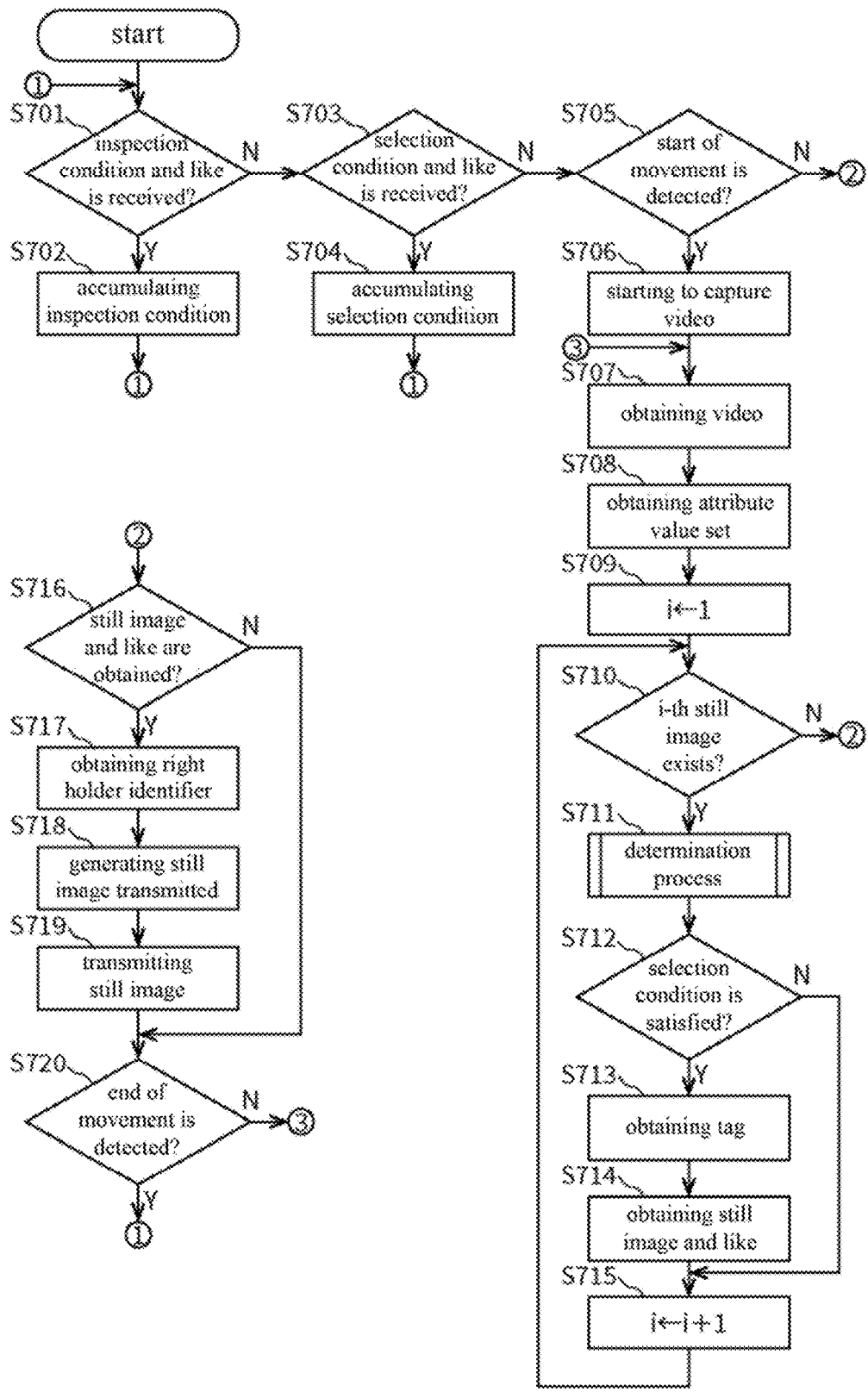
FIG. 7 is a flowchart for explaining an operation example of a mobile terminal 2 in the first embodiment.

Then, the tag obtainer 234 obtains the tag paired with the satisfied selection condition in accordance with the flowchart in FIG. 7. Then, the mobile processor 23 generates the information including the still image satisfying the selection condition, the attribute value set, the tag and the right holder identifier (here, "U001") of the mobile storage 21. Then, the image transmitter 241 transmits the generated information to the information processing device 1. Note that the attribute value set includes, for example, the tag, the road type identifier, the location information, the positional information and the like.

The above described processes are repeated in the mobile terminal 2 until the engine of the car is stopped.

The information processing device 1 operates as follows in accordance with the process of the flowchart in FIG. 3. Namely, the receiver 12 of the information processing device 1 receives the still image and the like from the mobile terminal 2. The still image and the like include the attribute value set including the right holder identifier, the still image and the tag. Here, it is assumed that the received tag is, for example "fallen object, tire."

Then, the processor 13 determines whether or not the still image and the like received in S305 satisfy the notification condition. Here, it is assumed that the notification condition is that the destination information associated with the received tag exits (not NULL "–"). The processor 13 obtains the destination information "destination S4" paired with the tag "fallen object, tire" from the reward management table (FIG. 9). Then, the transmitter 14 transmits the received still image and the like to the destination indicated by the destination information. Here, it is assumed that the destination indicated by "destination S4" is the terminal (not illustrated) of a person in charge of a road corporation that protects the safety of the highway. Then, the terminal of the person in charge receives and outputs the still image and the like. The person in charge watches the still image and the like, goes to the location indicated by the positional information paired with the still image and performs the operation of removing the fallen object from the highway.

Then, the right holder processor 132 of the information processing device 1 performs the preservation process shown below in accordance with the operation of the flowchart in FIG. 4.

First, the first preserver 1321 obtains the right holder identifier "U001" from which the still image is transmitted. Then, the first preserver 1321 accumulates the received still image and the like in the storage 11 while being associated with the right holder identifier "U001."

Then, the fourth preserver 1324 performs the fourth preservation process shown below in accordance with the operation of the flowchart in FIG. 5. Namely, the fourth preserver 1324 first obtains the access information (here, URL) for identifying the destination of the still image and the like. The fourth preserver 1324 obtains the attribute value set associated with the accumulated still image and the like. The fourth preserver 1324 generates the preservation information including the URL, the attribute value set and the right holder identifier "U001" of the still image and the like. The fourth preserver 1324 obtains the right holder identifier "X001" corresponding to the road corporation requiring the above described still image and the like. Note that it is assumed that the above described right holder identifier "X001" is managed while being paired with the tag "fallen object" in the storage 11. Then, the fourth preserver 1324 generates, for example, the preservation information including the right holder identifier "X001" and the original right holder identifier "U001." Then, the fourth preserver 1324 accumulates the generated preservation information in the block chain. Note that the preservation information may not include the original right holder identifier "U001."

Then, the rewarding unit 1325 performs the rewarding process shown below in accordance with the operation of the flowchart in FIG. 6. First, the rewarding unit 1325 obtains the right holder identifier "U001" of the target still image and the like. Then, the rewarding unit 1325 obtains the attribute value set of the target still image and the like including the tag "fallen object, tire." Then, the rewarding unit 1325 refers to the reward management table (FIG. 9) and obtains the reward information "100 yen" corresponding to the tag "fallen object, tire." Then, the rewarding unit 1325 performs the process of providing the reward information "100 yen" to the right holder identified by the right holder identifier "U001." The rewarding unit 1325 performs the process of causing the organization (organization corresponding to the right holder identifier "X001") that has enjoyed the service relevant to the target still image and the like to pay the reward "100 yen."

As described above, in the present embodiment, the still image satisfying the selection condition can be selected and used from the video captured by the mobile terminal 2. In the present embodiment, the still image satisfying each of two or more selection conditions can be selected and used from the video captured by the mobile terminal 2.

In the present embodiment, since the still image satisfying the inspection condition is made to be the target of the selection condition, the required still image can be obtained efficiently.

In the present embodiment, an appropriate tag can be added to the still image satisfying the condition.

In the present embodiment, the still image satisfying the condition can be selected and used from the videos capturing the movement surface of the mobile terminal 2 or the neighborhood of the movement surface.

In the present embodiment, the still image showing the road crack, the bridge damage, the manhole damage or the fallen object which is the defect of the movement surface of the mobile terminal 2 or the neighborhood of the movement surface can be selected and used.

In the present embodiment, the still image satisfying the selection condition can be received and accumulated from the videos captured by the mobile terminal 2.

In the present embodiment, the still image can be automatically transmitted to a person requiring the still image. In particular, in the present embodiment, the still image can be automatically transmitted to a person requiring the still image immediately after the still images and the like are received.

Furthermore, in the present embodiment, the reward is paid to the person who provided the image, and the right is given to the person who uses the image. Thus, both of them can provide and use the image without hindrance.

The processes of various devices in the present specification may be implemented with software. The software may be distributed by, for example, downloading the software. The software may be recorded in a recording medium such as a compact disk read-only memory (CD-ROM) for distribution. The same applies to another embodiment herein. The software for implementing the information processing device 1 according to the present embodiment is a program described below. Namely, this program causes the computer to function as: a receiver configured to receive a still image associated with a positional information from a mobile terminal 2; and an accumulator configured to accumulate the still image received by the receiver while being paired with the positional information.

The software for implementing the mobile terminal 2 according to the present embodiment is a program described below. Namely, this program causes the computer to function as: a position obtainer configured to obtain a positional information; an image capturer configured to obtain a video including a still image during a movement, the video being associated with the positional information; a determination unit configured to determine whether or not the still image included in the video obtained by the image capturer satisfies a selection condition; and an image transmitter configured to transmit the still image which is determined to satisfy the selection condition by the determination unit while being associated with the positional information obtained by the position obtainer.

Second Embodiment

In the second embodiment, the difference from the first embodiment is that the information processing device receives the video from the mobile terminal and performs the determination process to select the still image that satisfies the selection condition from the video.

<Outline of Information System B>

Figure 12:
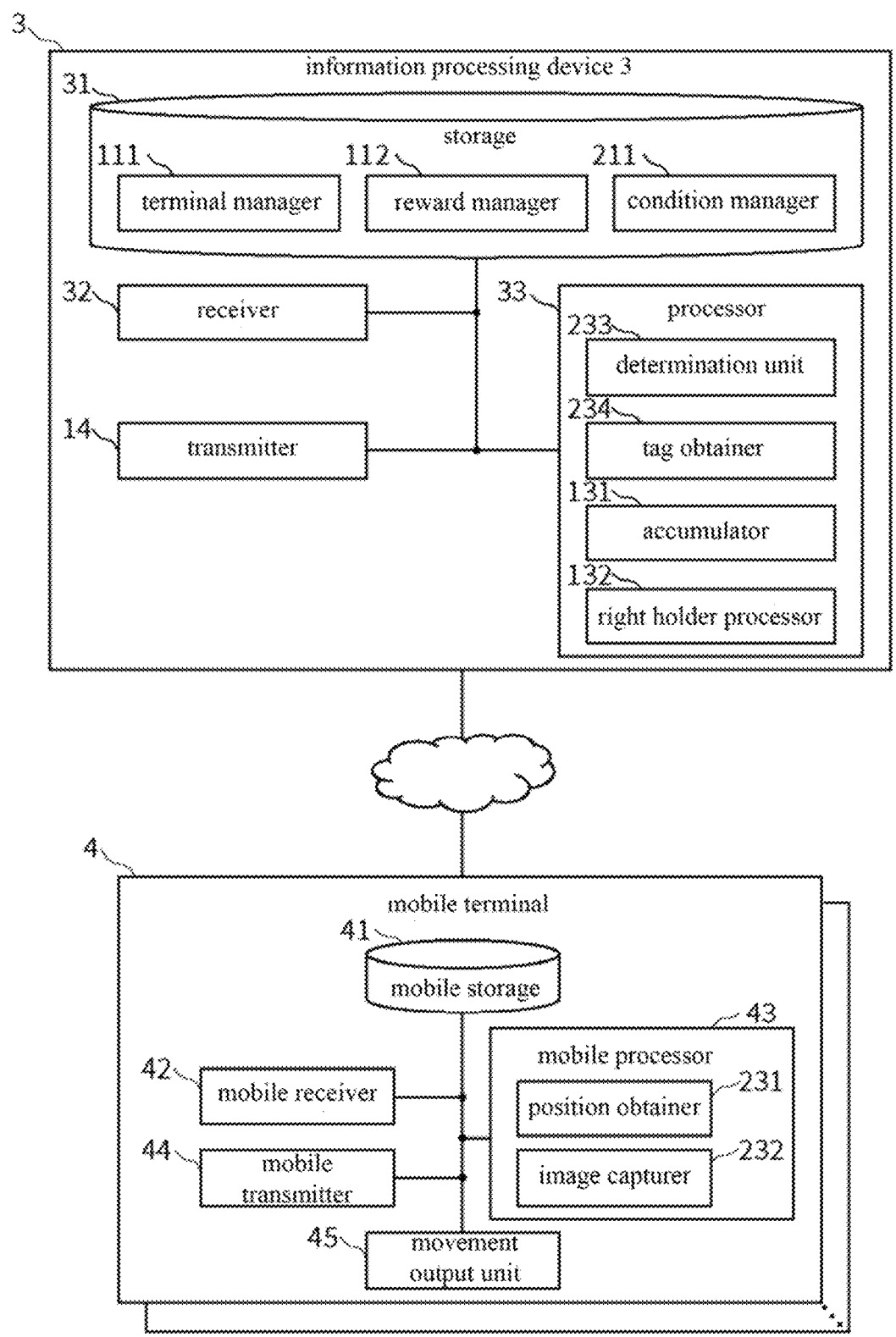
FIG. 12 is a block diagram of an information system B in the second embodiment.

The schematic diagram of the information system B of the second embodiment is same as FIG. 1 except for the reference numerals. FIG. 12 is a block diagram of an information system B in the second embodiment.

The information system B includes an information processing device 3 and one or a plurality of mobile terminals 4. The information processing device 3 is, for example, a cloud server or an application service provider (ASP) server. The type of the information processing device 3 is not limited. The information processing device 3 may be a device included in a blockchain. Since the information processing device 3 mainly performs the processes related to the images, the information processing device 1 can be referred to as an image processing device. The mobile terminal 4 is, for example, a drive recorder, a smartphone, a tablet terminal, a camera with a communication function or a glasses-type camera.

The information processing device 3 includes a storage 31, a receiver 32, a processor 33 and a transmitter 14. The storage 31 includes a terminal manager 111, a reward manager 112 and a condition manager 211. The processor 33 includes a determination unit 233, a tag obtainer 234, an accumulator 131 and a right holder processor 132.

The mobile terminal 4 includes a mobile storage 41, a mobile receiver 42, a mobile processor 43, a mobile transmitter 44 and a movement output unit 45. The mobile processor 43 includes a position obtainer 231 and an image capturer 232.

<Detail of Components of Information Processing Device 3>

The storage 31 included in the information processing device 3 stores various kinds of information. The various kinds of information is, for example, the terminal information, the reward information, the detection condition, the selection condition, the video, the still image and the attribute value set such as the positional information.

The receiver 32 receives the video including a plurality of still images captured when the mobile terminal 4 is moving. Note that the attribute value set including the positional information is associated with the still image. However, the still image not associated with the positional information and the like may exist in the video.

The processor 33 performs various processes. For example, the various processes are performed by the determination unit 233, the tag obtainer 234, the accumulator 131 and the right holder processor 132, for example.

The determination unit 233 performs the determination process. The determination unit 233 determines whether or not the still image included in the video received by the receiver 32 satisfies the selection condition. The process of determining whether or not the selection condition is satisfied is explained in the first embodiment.

The accumulator 131 accumulates the still image determined to satisfy the selection condition by the determination unit 233 while being associated with the attribute value set including the positional information associated with the still image. Note that details of the accumulator 131 are explained in the first embodiment.

<Detail of Components of Mobile Terminal 4>

Various information is stored in the mobile storage 41 included in the mobile terminal 4. The various kinds of information is, for example, the video, the attribute value set, the right holder identifier and the map information.

The mobile receiver 42 receives various information. The mobile receiver 42 receives the information from the information processing device 3. The various kinds of information is, for example, the reward information.

The mobile processor 43 performs various processes. The various processes are, for example, the processes performed by the position obtainer 231 and the image capturer 232. The mobile processor 43 obtains the attribute value set. The above described processes are same as the processes of the mobile processor 23 and are explained above.

The mobile processor 43 performs, for example, the process of the navigation terminal. The process of the navigation terminal is, for example, the process of obtaining the road type identifier and the process of obtaining the location information corresponding to the current position.

The mobile transmitter 44 transmits various information to the information processing device 1. The various information is, for example, the video, the attribute value set and the right holder identifier.

The movement output unit 45 outputs the various information. The various information is, for example, the map information and the video.

Here, the output is the concept including the operation of displaying on a display, the operation of projecting with a projector, the operation of printing with a printer, the operation of outputting sound, the operation of transmitting to an external device, the operation of accumulating in a recording medium, and the operation of delivering a processed result to another processor or another program.

The storage 31 and the mobile storage 41 are preferably a nonvolatile recording medium. However, these storages may be a volatile recording medium.

The process of storing the information in the storage 31 or the like is not limited. For example, the information may be stored in the storage 31 or the like via a recording medium, the information transmitted via a communication line or the like may be stored in the storage 31 or the like, or the information inputted by an input device may be stored in the storage 31 or the like.

The receiver 32 and the mobile receiver 42 are normally implemented by a wireless or wired communication means. However, these receivers may be implemented by a means for receiving a broadcast.

The processor 33 and the mobile processor 43 may normally be implemented by a processor, a memory or the like. The processing procedure of the processor 33 or the like is normally implemented by a software and the software is stored in a recording medium such as a read-only memory (ROM). However, the processing procedure may be implemented by a hardware (dedicated circuit). Note that the processor is a central processing unit (CPU), a microprocessor unit (MPU), a graphical processing unit (GPU) or the like. The type of the processor is not limited.

The mobile transmitter 44 is normally implemented by a wireless or wired communication means. However, the mobile transmitter 44 may be implemented by a broadcast means.

The movement output unit 45 may or may not include an output device such as a display or a speaker. The movement output unit 45 may be implemented by a driver software of an output device or implemented by a driver software of an output device and the output device.

<Operation>

Figure 13:
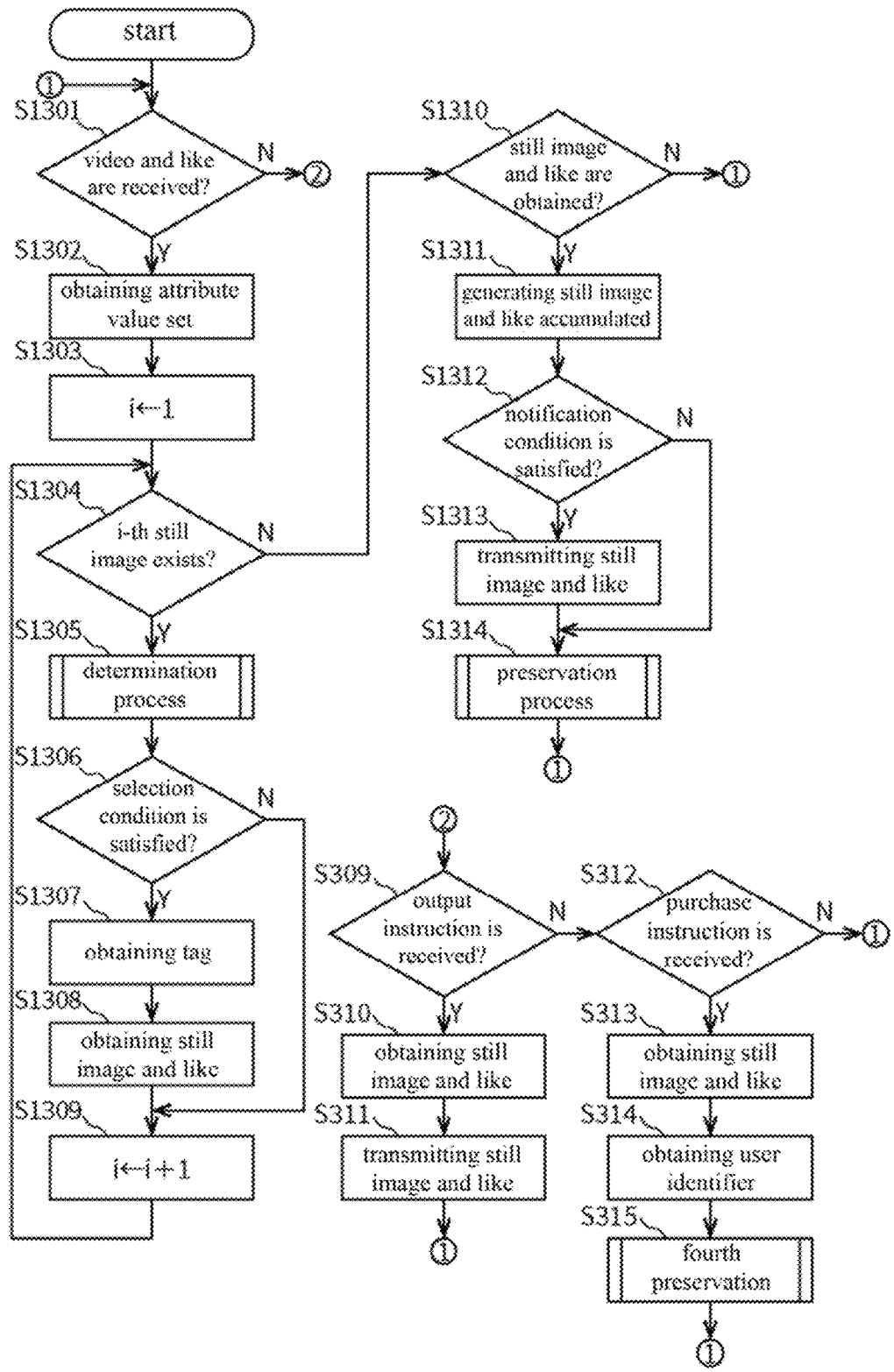
FIG. 13 is a flowchart for explaining an operation example of an information processing device 3 in the second embodiment.

Then, the operation example of the information system B will be explained. First, the operation example of the information processing device 3 will be explained using the flowchart in FIG. 13. In the flowchart of FIG. 13, the explanation of the steps same as the flowchart of FIG. 3 is omitted.

(S1301) The receiver 32 determines whether or not the video and the like are received from the mobile terminal 4. When the video and the like are received, the processing proceeds to S1302. When the video and the like are not received, the processing proceeds to S309. Note that the video and the like are, for example, the video, the attribute value set and the right holder identifier.

(S1302) The processor 33 obtains the attribute value set associated with the video.

(S1303) The processor 33 substitutes 1 for a counter i.

(S1304) The processor 33 determines whether or not the i-th still image exists in the video received in S1301. When the i-th still image exists, the processing proceeds to S1305. When the i-th still image does not exist, the processing proceeds to S1310.

(S1305) The determination unit 233 performs the determination process on the i-th still image. The example of the determination process is explained using the flowchart in FIG. 8.

(S1306) When the determination result in S1305 is the determination condition "satisfying selection condition," the processing proceeds to S1307. When the determination condition "not satisfying selection condition," the processing proceeds to S1309.

(S1307) The tag obtainer 234 obtains the tag paired with each of one or more satisfied selection conditions from the storage 31.

(S1308) The processor 33 generates the information including the still image and the like and one or more tags. Note that the processor 33 here may generate the information including a plurality of still images satisfying the selection condition. All of the plurality of still images preferably satisfy the selection condition. However, the still image not satisfying the selection condition may be included. The plurality of still images is preferably continued in a time series manner.

(S1309) The processor 33 increments the counter i by 1. The processing returns to S1304.

Note that the processor 33 here preferably increments the counter i by N (N is a natural number of 2 or more). Namely, it is preferable to perform the determination process on the still images which are thinned-out.

(S1310) The processor 33 determines whether or not the information is generated in S1308. When the information is generated, the processing proceeds to S1311. When the information is not generated, the processing returns to S1301.

(S1311) The processor 33 generates the still image and the like to be accumulated. The still image and the like are, for example, one or a plurality of still images, the attribute value set including the tag, and the right holder identifier.

(S1312) The processor 33 determines whether or not the still image and the like to be accumulated satisfy the notification condition. When the notification condition is satisfied, the process proceeds to S1313. When the notification condition is not satisfied, the process proceeds to S1314.

(S1313) The processor 13 obtains the destination information corresponding to the still image and the like. The transmitter 14 transmits the still image and the like to the destination indicated by the destination information.

(S1314) The right holder processor 132 performs a preservation process. The processing returns to S1301. Note that the example of the preservation process is explained using the flowchart in FIG. 4.

In the flowchart in FIG. 13, the process ends when the power is turned off or the instruction of ending process is interrupted.

Figure 14:
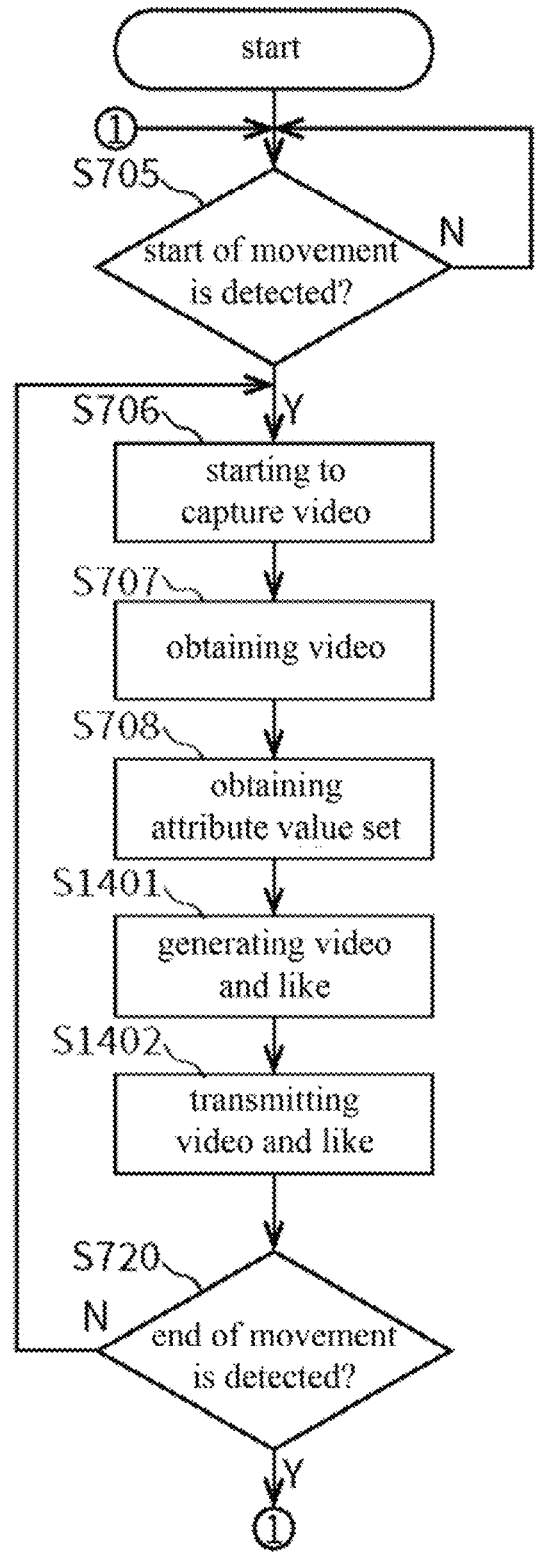
FIG. 14 is a flowchart for explaining an operation example of a mobile terminal 4.

Then, the operation example of the mobile terminal 4 will be explained using the flowchart in FIG. 14. In the flowchart of FIG. 14, the explanation of the steps same as the flowchart of FIG. 7 is omitted.

(S1401) The mobile processor 43 generates the information to be transmitted. Note that the above described information includes the video and the like. The video and the like are, for example, the video, the attribute value set and the right holder identifier.

(S1402) The mobile transmitter 44 transmits the information generated in S1401 to the information processing device 3. The process proceeds to S720.

In the flowchart in FIG. 14, the process ends when the power is turned off or the instruction of ending process is interrupted.

As described above, in the present embodiment, the still image satisfying the selection condition can be selected and used from the video captured by the mobile terminal 4. In the present embodiment, the still image satisfying each of two or more selection conditions can be selected and used from the video captured by the mobile terminal 4.

In the present embodiment, since the still image satisfying the inspection condition is made to be the target of the selection condition, the required still image can be obtained efficiently.

In the present embodiment, an appropriate tag can be added to the still image satisfying the condition.

In the present embodiment, the still image satisfying the condition can be selected and used from the videos capturing the movement surface of the mobile terminal 4 or the neighborhood of the movement surface.

In the present embodiment, the still image showing the road crack, the bridge damage, the manhole damage or the fallen object which is the defect of the movement surface of the mobile terminal 4 or the neighborhood of the movement surface can be selected and used.

In the present embodiment, the still image satisfying the selection condition can be received and accumulated from the videos captured by the mobile terminal 4.

In the present embodiment, the still image can be automatically transmitted to a person requiring the still image. In particular, in the present embodiment, the still image can be transmitted to a person requiring the still image immediately after the still images and the like are received.

Figure 15:
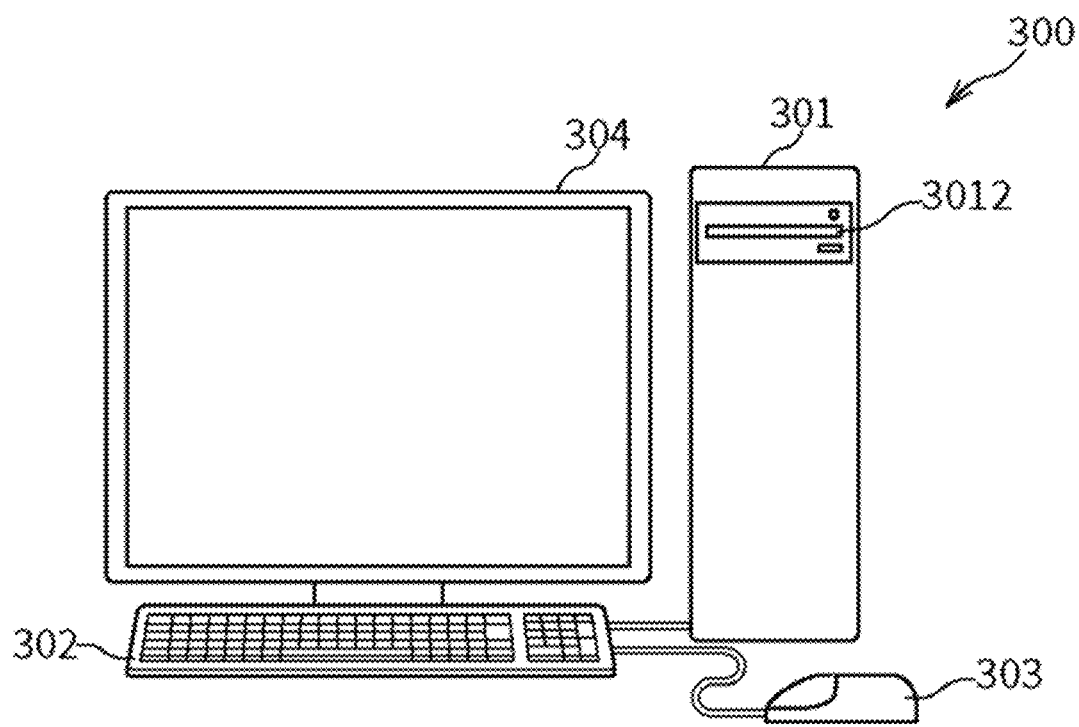
FIG. 15 is a schematic external view of a computer system in the above described embodiments.

FIG. 15 shows the external appearance of a computer that executes the program described in this specification and achieves the information processing device 1, the mobile terminal 2, the information processing device 3 and the mobile terminal 4 described above. The above described embodiments can be implemented with computer hardware and a computer program executed on the computer hardware. FIG. 15 is a schematic diagram of a computer system 300 and FIG. 16 is a block diagram of the system 300.

In FIG. 15, the computer system 300 includes a computer 301 including a CD-ROM drive, a keyboard 302, a mouse 303 and a monitor 304.

Figure 16:
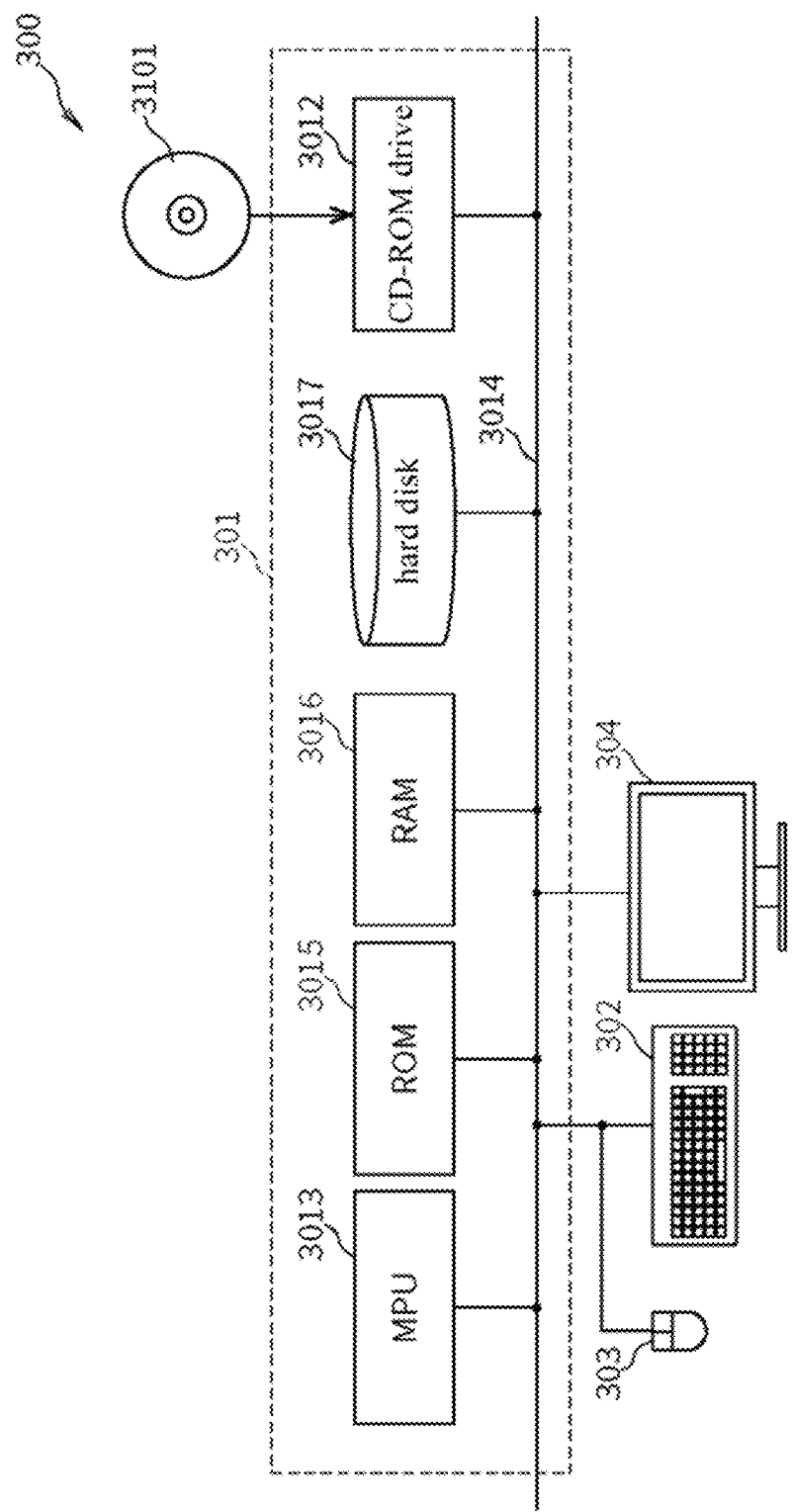
FIG. 16 is a block diagram of the computer system in the above described embodiments.

In FIG. 16, the computer 301 includes a CD-ROM drive 3012, a microprocessor unit (MPU) 3013, a bus 3014 connected to the CD-ROM drive 3012 or the like, a read-only memory (ROM) 3015 storing programs such as a boot-up program, a random access memory (RAM) 3016 connected to the MPU 3013, temporary storing a command from an application program, and providing a temporarily storing space, and a hard disk 3017 storing an application program, a system program and data. Although not shown in the figure, the computer 301 may include a network card that allows connection to a local area network (LAN).

A program that causes the computer system 300 to function as, for example, the information processing device 1 according to the above described embodiment may be stored in a CD-ROM 3101, inserted into the CD-ROM drive 3012 and transferred to the hard disk 3017. Alternatively, the program may be transmitted to the computer 301 through a not-illustrated network and stored in the hard disk 3017. The program is loaded on the RAM 3016 when the program is executed. The program may be directly loaded from the CD-ROM 3101 or the network.

It is not necessary for the programs to include, for example, a third party program or an operation system (OS) that causes the computer 301 to function as, for example, the information processing device 1 according to the above described embodiment. The programs may be any program that includes a command to call an appropriate function (module) in a controlled manner and obtain an intended result. The manner in which the computer system 300 operates is conventionally known. Thus, the detailed explanation is omitted.

The steps in the above described program, such as transmitting or receiving information, do not include processing performed by hardware, or for example, processing performed by a modem or an interface card in the transmission step (processing performed by hardware alone).

One or more computers may execute the above described program. Namely, either integrated processing or distributed processing may be performed.

In each of the above described embodiments, a plurality of communicators included in a single device may be implemented by a single physical medium.

In each of the embodiments, each process may be performed by a single device through integrated processing or by multiple devices through distributed processing.

The present invention is not limited to the above embodiments, but may be modified variously within the scope of the present invention.

INDUSTRIAL APPLICABILITY

As described above, the mobile terminal of the present invention has the effect capable of selecting and using the still image satisfying the condition from the video captured by the mobile terminal and is effective as a drive recorder or the like installed on the car.

The invention claimed is:

1. An information processing device comprising:
  a receiver configured to receive a video including a plurality of still images captured by a mobile terminal during a movement, each of the plurality of still images being associated with a tag and a positional information indicating a capturing position;
  a determination unit configured to determine whether or not the plurality of still images included in the video received by the receiver satisfies a selection condition;
  an accumulator configured to accumulate the plurality of still images determined to satisfy the selection condition by the determination unit while being associated with the positional information associated with the plurality of still images;
  a storage configured to store the tag and a destination information identifying a destination of the plurality of still images while being associated with each other, the tag being an information indicating a characteristic element contained in the plurality of still images; and
  a transmitter configured to transmit the plurality of still images associated with the tag to the destination based on the destination information.

2. The information processing device according to claim 1, wherein
  the plurality of still images accumulated by the accumulator is associated with a right holder identifier identifying a right holder of the plurality of still images, and
  a right holder processor is further provided to store a preservation information including an access information for accessing the plurality of still images in a blockchain.

3. An information processing method used for an information processing device including a receiver, a determination unit, an accumulation unit, a storage and a transmitter, the method comprising:
  a step of receiving, by the receiver, a video including a plurality of still images captured by a mobile terminal during a movement, each of the plurality of still images being associated with a tag and a positional information indicating a capturing position;
  a step of determining, by the determination unit, whether or not the plurality of still images included in the video received by the receiver satisfies a selection condition;
  a step of accumulating, by the accumulator, the plurality of still images determined to satisfy the selection condition by the determination unit while being associated with the positional information associated with the plurality of still images;
  a step of storing, by the storage, the tag and a destination information identifying a destination of the plurality of still images while being associated with each other, the tag being an information indicating a characteristic element contained in the plurality of still images; and
  a step of transmitting, by the transmitter, the plurality of still images associated with the tag to the destination based on the destination information.

* * * * *